United States Patent
Saggar et al.

(10) Patent No.: US 11,831,573 B2
(45) Date of Patent: Nov. 28, 2023

(54) SENDING REFERENCE SIGNALS DURING SYMBOL PADDING

(71) Applicant: QUALCOMM Incorporated, San Diego, CA (US)

(72) Inventors: Hemant Saggar, Irvine, CA (US); Iyab Issam Sakhnini, San Diego, CA (US); Jun Ma, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 17/387,562

(22) Filed: Jul. 28, 2021

(65) Prior Publication Data

US 2023/0047938 A1 Feb. 16, 2023

(51) Int. Cl.
*H04L 5/00* (2006.01)
*H04L 27/26* (2006.01)

(52) U.S. Cl.
CPC ........ *H04L 5/0048* (2013.01); *H04L 27/2605* (2013.01)

(58) Field of Classification Search
CPC .......................... H04L 5/0048; H04L 27/2605
See application file for complete search history.

(56) References Cited

U.S. PATENT DOCUMENTS

| 9,160,511 | B2 | 10/2015 | Walker et al. | |
|---|---|---|---|---|
| 2019/0386862 | A1 | 12/2019 | Islam et al. | |
| 2021/0160868 | A1 | 5/2021 | Bhattad et al. | |
| 2022/0399930 | A1* | 12/2022 | Saggar | H04W 16/28 |
| 2022/0399951 | A1* | 12/2022 | Saggar | H04L 41/0803 |

OTHER PUBLICATIONS

International Search Report and Written Opinion—PCT/US2022/037482—ISA/EPO—dated Nov. 9, 2022 (2103250WO).

* cited by examiner

*Primary Examiner* — Duc C Ho
(74) *Attorney, Agent, or Firm* — Holland & Hart LLP

(57) ABSTRACT

Methods, systems, and devices for wireless communications are described. A user equipment (UE) may receive an indication of a subcarrier spacing (SCS) for communications in a transmission time interval (TTI), such as a half-subframe, including multiple symbols, corresponding cyclic prefixes, and a padding duration which is at least as long as a symbol duration. The UE may receive a configuration for the padding duration, indicating that at least a portion of the padding duration is reallocated for a reference signal that indicates waveform parameters for one or more symbols of the TTI after the padding duration. The UE may receive the reference signal indicating the waveform parameters during the portion of the padding duration and communicate during the one or more symbols of the TTI according to the waveform parameters.

30 Claims, 19 Drawing Sheets

SENDING REFERENCE SIGNALS DURING SYMBOL PADDING

FIELD OF TECHNOLOGY

The following relates to wireless communications, including sending reference signals during symbol padding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a first symbol of a half-subframe includes a padding duration to have an integer number of symbols and symbol boundaries within a half-slot duration. Some techniques for using the padding duration may be deficient.

SUMMARY

The described techniques relate to improved methods, systems, devices, and apparatuses that support sending reference signals during symbol padding. Generally, the described techniques provide for a user equipment (UE) to transmit or receive a reference signal during a padding duration of a symbol. In some systems, transmission time interval (TTI), such as a half-subframe, may be configured to have an integer number of symbols and symbol boundaries occur at certain periodicities (e.g., every 0.5 milliseconds) for any subcarrier spacing (SCS) configuration. To have an integer number of symbols and symbol boundaries in some numerologies, a small padding duration may be at the start of each TTI boundary to align the integer number of symbols and symbol boundaries within the TTI. A wireless device, such as a UE or a base station, may transmit a reference signal during the padding duration. For example, the wireless device may be configured with a high SCS, where the padding duration spans at least a symbol period. In some cases, the reference signal may be used to indicate parameters for an upcoming waveform in a following one or more symbols. For example, the reference signal may indicate a waveform type, beam parameters, a directional symbol allocation, resource allocation information, or any combination thereof, which are used or configured for one or more symbols later in the TTI. In some cases, the reference signal may be used for estimation or measurements, such as channel estimation, phase tracking, or time and frequency synchronization.

A method for wireless communication at a UE is described. The method may include receiving an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration, receiving a control signal indicating a configuration for the padding duration, where the configuration indicates that at least a portion of the padding duration is to be reallocated for a reference signal that indicates a set of one or more waveform parameters for one or more symbols of the TTI after the padding duration, receiving the reference signal during the portion of the padding duration according to the configuration, and communicating during the one or more symbols of the TTI after the padding duration according to the set of one or more waveform parameters indicated by the received reference signal.

An apparatus for wireless communication at a UE is described. The apparatus may include a processor, memory coupled with the processor, and instructions stored in the memory. The instructions may be executable by the processor to cause the apparatus to receive an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration, receive a control signal indicating a configuration for the padding duration, where the configuration indicates that at least a portion of the padding duration is to be reallocated for a reference signal that indicates a set of one or more waveform parameters for one or more symbols of the TTI after the padding duration, receive the reference signal during the portion of the padding duration according to the configuration, and communicate during the one or more symbols of the TTI after the padding duration according to the set of one or more waveform parameters indicated by the received reference signal.

Another apparatus for wireless communication at a UE is described. The apparatus may include means for receiving an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration, means for receiving a control signal indicating a configuration for the padding duration, where the configuration indicates that at least a portion of the padding duration is to be reallocated for a reference signal that indicates a set of one or more waveform parameters for one or more symbols of the TTI after the padding duration, means for receiving the reference signal during the portion of the padding duration according to the configuration, and means for communicating during the one or more symbols of the TTI after the padding duration according to the set of one or more waveform parameters indicated by the received reference signal.

A non-transitory computer-readable medium storing code for wireless communication at a UE is described. The code may include instructions executable by a processor to receive an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration, receive a control signal indicating a configuration for the padding duration, where the configuration indicates that at least a portion of the padding duration is to be reallocated for a reference signal that indicates a set of one or more waveform parameters for one or more symbols of the TTI after the padding duration, receive the reference signal during the portion of the padding duration according to the configuration, and communicate during the one or more symbols of the TTI after the padding duration according to the set of one or more waveform parameters indicated by the received reference signal.

Some examples of the method, apparatuses, and non-transitory computer-readable medium described herein may further include operations, features, means, or instructions for receiving an indication of a table of a set of multiple sets of waveform parameters, where the reference signal indicates an index to an entry of the table that identifies a set of waveform parameters of the set of multiple sets of waveform parameters for communicating during the one or more symbols of the TTI.

Some examples of the method, apparatuses, and non-transitory computer-readable medium described herein may further include operations, features, means, or instructions for determining the set of one or more waveform parameters based on a cyclic shift of the reference signal, a length of a sequence forming the reference signal, a sample duration of the reference signal, a frequency hopping pattern of the reference signal, a sequence type of the sequence forming the reference signal, a location of the reference signal within the padding duration, or any combination thereof.

In some examples of the method, apparatuses, and non-transitory computer-readable medium described herein, communicating according to the set of one or more waveform parameters may include operations, features, means, or instructions for communicating according to a waveform type, a bandwidth part, a beam, a precoder, a symbol allocation, or any combination thereof, indicated by the set of one or more waveform parameters.

In some examples of the method, apparatuses, and non-transitory computer-readable medium described herein, receiving the control signal indicating the configuration for the padding duration may include operations, features, means, or instructions for receiving an indication of an offset of zero or more from the reference signal to a first symbol of the one or more symbols of the TTI in which the set of one or more waveform parameters may be applied.

Some examples of the method, apparatuses, and non-transitory computer-readable medium described herein may further include operations, features, means, or instructions for determining the offset based on a waveform switching capability of the UE, where the offset includes one or more samples or one or more symbol periods.

In some examples of the method, apparatuses, and non-transitory computer-readable medium described herein, receiving the reference signal may include operations, features, means, or instructions for receiving the reference signal as a multi-carrier waveform or a single carrier waveform.

Some examples of the method, apparatuses, and non-transitory computer-readable medium described herein may further include operations, features, means, or instructions for transmitting, to a base station, an indication of a UE capability to receive reference signals during padding durations, where the control signal indicating the configuration for the padding duration may be received based on transmitting the UE capability.

In some examples of the method, apparatuses, and non-transitory computer-readable medium described herein, receiving the reference signal may include operations, features, means, or instructions for receiving a phase tracking reference signal, a demodulation reference signal, a channel state information reference signal, or any combination thereof.

In some examples of the method, apparatuses, and non-transitory computer-readable medium described herein, receiving the reference signal may include operations, features, means, or instructions for receiving the reference signal and a cyclic prefix for the reference signal during the portion of the padding duration, where the reference signal spans a shorter time duration than a symbol period based on the SCS.

In some examples of the method, apparatuses, and non-transitory computer-readable medium described herein, receiving the reference signal may include operations, features, means, or instructions for receiving a set of multiple reference signals during the portion of the padding duration based on the SCS of the TTI.

Some examples of the method, apparatuses, and non-transitory computer-readable medium described herein may further include operations, features, means, or instructions for receiving, during a remaining portion of the padding duration, a cyclic prefix associated with one or more of the reference signals, the set of multiple symbols, or the set of multiple cyclic prefixes.

Some examples of the method, apparatuses, and non-transitory computer-readable medium described herein may further include operations, features, means, or instructions for performing a noise and interference measurement on a wireless channel used for the communicating during a remaining portion of the padding duration.

In some examples of the method, apparatuses, and non-transitory computer-readable medium described herein, receiving the reference signal may include operations, features, means, or instructions for receiving an indication of a retransmission request from a base station based on a configuration of the received reference signal.

Some examples of the method, apparatuses, and non-transitory computer-readable medium described herein may further include operations, features, means, or instructions for transmitting, during the portion of the padding duration, an indication of acknowledgement feedback in response to a received downlink message.

Some examples of the method, apparatuses, and non-transitory computer-readable medium described herein may further include operations, features, means, or instructions for identifying a first set of waveform parameters applicable to the communicating during the one or more symbols, determining a waveform parameter value for one or more waveform parameters of the first set of waveform parameters based on the reference signal, and communicating during the one or more symbols according to the first set of waveform parameters and the waveform parameter value determined based on the reference signal.

A method for wireless communication at a base station is described. The method may include transmitting, to a UE, an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration, transmitting a control signal indicating a configuration for the padding duration, where the configuration indicates that at least a portion of the padding duration is to be reallocated for a reference signal that indicates a set of one or more waveform parameters for one or more symbols of the TTI after the padding duration, transmitting the reference signal during the portion of the padding duration according to the configuration, and communicating during the one or more symbols of the TTI after the padding duration according to the set of one or more waveform parameters indicated by the transmitted reference signal.

An apparatus for wireless communication at a base station is described. The apparatus may include a processor, memory coupled with the processor, and instructions stored in the memory. The instructions may be executable by the processor to cause the apparatus to transmit, to a UE, an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration, transmit a control signal indicating a configuration for the padding duration, where the configuration indicates that at least a portion of the padding duration is to be reallocated for a reference signal that indicates a set of one or more waveform parameters for one or more symbols of the TTI after the padding duration, transmit the reference signal during the portion of the padding duration according to the configuration, and communicate during the one or more symbols of the TTI after the padding duration according to the set of one or more waveform parameters indicated by the transmitted reference signal.

Another apparatus for wireless communication at a base station is described. The apparatus may include means for transmitting, to a UE, an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration, means for transmitting a control signal indicating a configuration for the padding duration, where the configuration indicates that at least a portion of the padding duration is to be reallocated for a reference signal that indicates a set of one or more waveform parameters for one or more symbols of the TTI after the padding duration, means for transmitting the reference signal during the portion of the padding duration according to the configuration, and means for communicating during the one or more symbols of the TTI after the padding duration according to the set of one or more waveform parameters indicated by the transmitted reference signal.

A non-transitory computer-readable medium storing code for wireless communication at a base station is described. The code may include instructions executable by a processor to transmit, to a UE, an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration, transmit a control signal indicating a configuration for the padding duration, where the configuration indicates that at least a portion of the padding duration is to be reallocated for a reference signal that indicates a set of one or more waveform parameters for one or more symbols of the TTI after the padding duration, transmit the reference signal during the portion of the padding duration according to the configuration, and communicate during the one or more symbols of the TTI after the padding duration according to the set of one or more waveform parameters indicated by the transmitted reference signal.

Some examples of the method, apparatuses, and non-transitory computer-readable medium described herein may further include operations, features, means, or instructions for transmitting an indication of a table of a set of multiple sets of waveform parameters, where the reference signal indicates an index to an entry of the table that identifies a set of waveform parameters of the set of multiple sets of waveform parameters for communicating during the one or more symbols of the TTI.

Some examples of the method, apparatuses, and non-transitory computer-readable medium described herein may further include operations, features, means, or instructions for indicating the set of one or more waveform parameters based on a cyclic shift of the reference signal, a length of a sequence forming the reference signal, a sample duration of the reference signal, a frequency hopping pattern of the reference signal, a sequence type of the sequence forming the reference signal, a location of the reference signal within the padding duration, or any combination thereof.

In some examples of the method, apparatuses, and non-transitory computer-readable medium described herein, communicating according to the set of one or more waveform parameters may include operations, features, means, or instructions for communicating according to a waveform type, a bandwidth part, a beam, a precoder, a symbol allocation, or any combination thereof, indicated by the set of one or more waveform parameters.

In some examples of the method, apparatuses, and non-transitory computer-readable medium described herein, transmitting the control signal indicating the configuration for the padding duration may include operations, features, means, or instructions for transmitting an indication of an offset from the reference signal to a first symbol of the one or more symbols of the TTI for communicating according to the set of one or more waveform parameters.

Some examples of the method, apparatuses, and non-transitory computer-readable medium described herein may further include operations, features, means, or instructions for receiving, from the UE, an indication of a UE capability to receive reference signals during padding durations, where the control signal indicating the configuration for the padding duration may be transmitted based on receiving the indication of the UE capability.

In some examples of the method, apparatuses, and non-transitory computer-readable medium described herein, transmitting the reference signal may include operations, features, means, or instructions for transmitting the reference signal and a cyclic prefix for the reference signal during the portion of the padding duration, where the reference signal spans a shorter time duration than a symbol period based on the SCS.

In some examples of the method, apparatuses, and non-transitory computer-readable medium described herein, transmitting the reference signal may include operations, features, means, or instructions for transmitting a set of multiple reference signals during the portion of the padding duration based on the SCS of the TTI.

Some examples of the method, apparatuses, and non-transitory computer-readable medium described herein may further include operations, features, means, or instructions for transmitting, during a remaining portion of the padding duration, a cyclic prefix associated with one or more of the reference signal, the set of multiple symbols, or the set of multiple cyclic prefixes.

Some examples of the method, apparatuses, and non-transitory computer-readable medium described herein may further include operations, features, means, or instructions for performing a noise and interference measurement on a wireless channel used for the communicating during a remaining portion of the padding duration.

In some examples of the method, apparatuses, and non-transitory computer-readable medium described herein, transmitting the reference signal may include operations, features, means, or instructions for transmitting an indication of a retransmission request to the UE based on a configuration of the received reference signal.

Some examples of the method, apparatuses, and non-transitory computer-readable medium described herein may further include operations, features, means, or instructions for receiving, during the portion of the padding duration, an indication of acknowledgment feedback in response to a transmitted downlink message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

Figure 1:
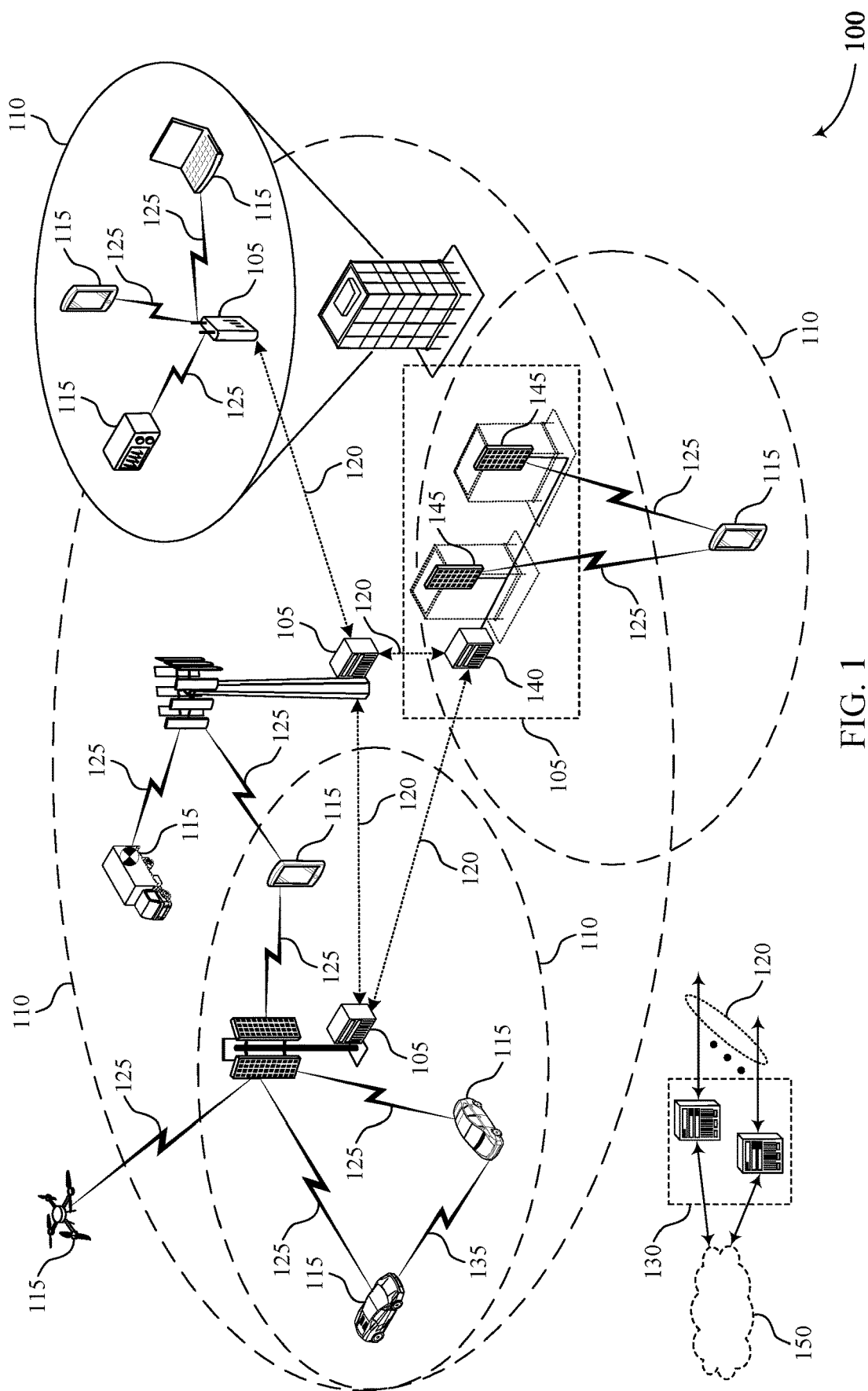
FIG. 1 illustrates an example of a wireless communications system that supports sending reference signals during symbol padding in accordance with aspects of the present disclosure.

In some wireless communications systems, wireless resources may be configured or allocated according to transmission time intervals (TTIs) such as subframes, half-subframes, slots, etc. In some systems, some TTIs may be configured to have an integer number of symbols and symbol boundaries within a certain time duration. For example, in New Radio (NR) systems, a half-subframe may be configured to have an integer number of symbols and symbol boundaries occur at certain periodicities (e.g., every 0.5 milliseconds) for any SCS (SCS) configuration. For example, there may be an integer number of symbol and symbol boundaries in some systems at 0.5 millisecond boundaries from 15 KHz SCS configurations to 120 KHz SCS configuration or higher. To have an integer number of symbols and symbol boundaries in a TTI, a small padding duration may be at the start of each boundary to align the integer number of symbols and symbol boundaries within the configured interval. For example, at the start of each 0.5 millisecond interval, there may be an extra padding duration, which may be used for extra cyclic prefix information. This extra padding duration may be included for each numerology (e.g., SCS configuration), from 15 KHz to 120 KHz or higher.

The padding duration may use a small (e.g., a relatively small) amount of resources within the half-subframe. For example, the padding duration may span around 0.5 microseconds within a 0.5 millisecond half-subframe. At low SCS configurations, this padding duration may span a portion of a symbol period duration. For example, at an SCS of 15 KHz, the padding length may be less than 10% of the length of a symbol period. However, at higher numerologies, the padding duration may span the length of a symbol period or more. For example, at an SCS of 1920 KHz, the padding duration may span the length of a symbol period. This padding duration may be inefficiently used or wasted in these systems.

The present disclosure provides techniques for efficiently using a padding duration in a half-subframe. For example, a wireless device may send a reference signal during the padding duration, such as if the wireless device is operating at a high numerology where the padding duration spans at least a symbol period. In some cases, the reference signal may be used to indicate parameters for an upcoming waveform in a following one or more symbols. For example, the reference signal may indicate a waveform type, beam parameters, a directional symbol allocation, resource allocation information, or any combination thereof, which are used or configured for one or more symbols which are after the reference signal. In some cases, the one or more symbols may be after an offset (e.g., of 0, 1, 2, 3, or more symbol periods), which may also be indicated by the reference signal or otherwise configured. In some examples, the waveform parameters or waveform indication may be overwritten or reconfigured by transmitting control signaling, such as downlink control information (DCI) from a base station, a medium access control (MAC) control element (CE), or Radio Resource Control (RRC) signaling.

In some cases, the reference signal may be used for parameter estimation, such as channel estimation, phase tracking, or time and frequency synchronization. In some cases, the reference signal transmitted during the padding duration may be used by a user equipment (UE) to indicate acknowledgment feedback (e.g., an acknowledgment (ACK) or negative ACK (NACK)). In some cases, the reference signal may be transmitted by a base station to indicate a retransmission request to a UE. In some cases, either the presence or absence of a reference signal during a padding duration, a type of signal transmitted, or resources used to transmit the reference signal during the padding duration, may indicate the feedback message or retransmission request.

Aspects of the disclosure are initially described in the context of wireless communications systems. Aspects of the disclosure are further illustrated by and described with reference to apparatus diagrams, system diagrams, and flowcharts that relate to sending reference signals during symbol padding.

FIG. 1 illustrates an example of a wireless communications system 100 that supports sending reference signals during symbol padding in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may be based on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE- SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless resources in the wireless communications system 100 may be configured or allocated according to TTIs such as subframes, half-subframes, slots, etc. In some systems, some TTIs may be configured to have an integer number of symbols and symbol boundaries within a certain time duration. For example, in some NR systems, a half-subframe may be configured to have an integer number of symbols and symbol boundaries occur at certain periodicities (e.g., every 0.5 milliseconds) for any SCS configuration. For example, there may be an integer number of symbol and symbol boundaries in some systems at 0.5 millisecond boundaries from 15 KHz SCS configurations to 120 KHz SCS configuration or higher.

To have an integer number of symbols and symbol boundaries in a TTI, a small padding duration may be at the start of each boundary to align the integer number of symbols and symbol boundaries within the configured interval. For example, at the start of each 0.5 millisecond interval, there may be an extra padding duration, which may be used for extra cyclic prefix information. This extra padding duration may be included for each numerology (e.g., SCS configuration), from 15 KHz to 120 KHz or higher.

The padding duration may use a small (e.g., a relatively small) amount of resources within the half-subframe. For example, the padding duration may span around 0.5 microseconds within a 0.5 millisecond half-subframe. At low SCS configurations, this padding duration may span a portion of a symbol period duration. For example, at 15 KHz, the padding length may be less than 10% of the length of a symbol period. However, at higher numerologies, the padding duration may span the length of a symbol period or more. For example, at 1920 KHz, the padding duration may span the length of a symbol period. This padding duration may be inefficiently used in these systems.

Wireless communications systems described herein, such as the wireless communications system 100, may implement techniques to efficiently use a padding duration in a TTI such as a half-subframe. For example, a wireless device (e.g., a UE 115 or a base station 105, or both) may send a reference signal during the padding duration. For example, if the wireless device is operating at a high numerology where the padding duration spans at least a symbol period, the wireless device may be configured to transmit or receive a reference signal during the padding duration.

In some cases, the reference signal may be used to indicate parameters for an upcoming waveform in a following one or more symbols. For example, the reference signal may indicate a waveform type, a beam, a directional symbol allocation, resource allocation information, or any combination thereof, which are used or configured for one or more symbols which are after the reference signal. In some cases, the one or more symbols may be after an offset (e.g., of 0 or more symbol periods), which may also be indicated by the reference signal or otherwise configured. In some examples, the waveform parameters or waveform indication may be overwritten or reconfigured by transmitting control signaling, such as DCI from a base station 105, a MAC CE, or RRC signaling.

In some cases, the reference signal may be used for parameter estimation, such as channel estimation, phase tracking, or time and frequency synchronization. In some cases, the reference signal transmitted during the padding duration may be used by a UE 115 to indicate acknowledgment feedback (e.g., ACK/NACK feedback). In some cases, the reference signal may be transmitted by a base station 105 to indicate a retransmission request to a UE 115. In some cases, either the presence or absence of a reference signal during a padding duration, a type of signal transmitted, or resources used to transmit the reference signal during the padding duration, may indicate the feedback message or retransmission request.

Figure 2:
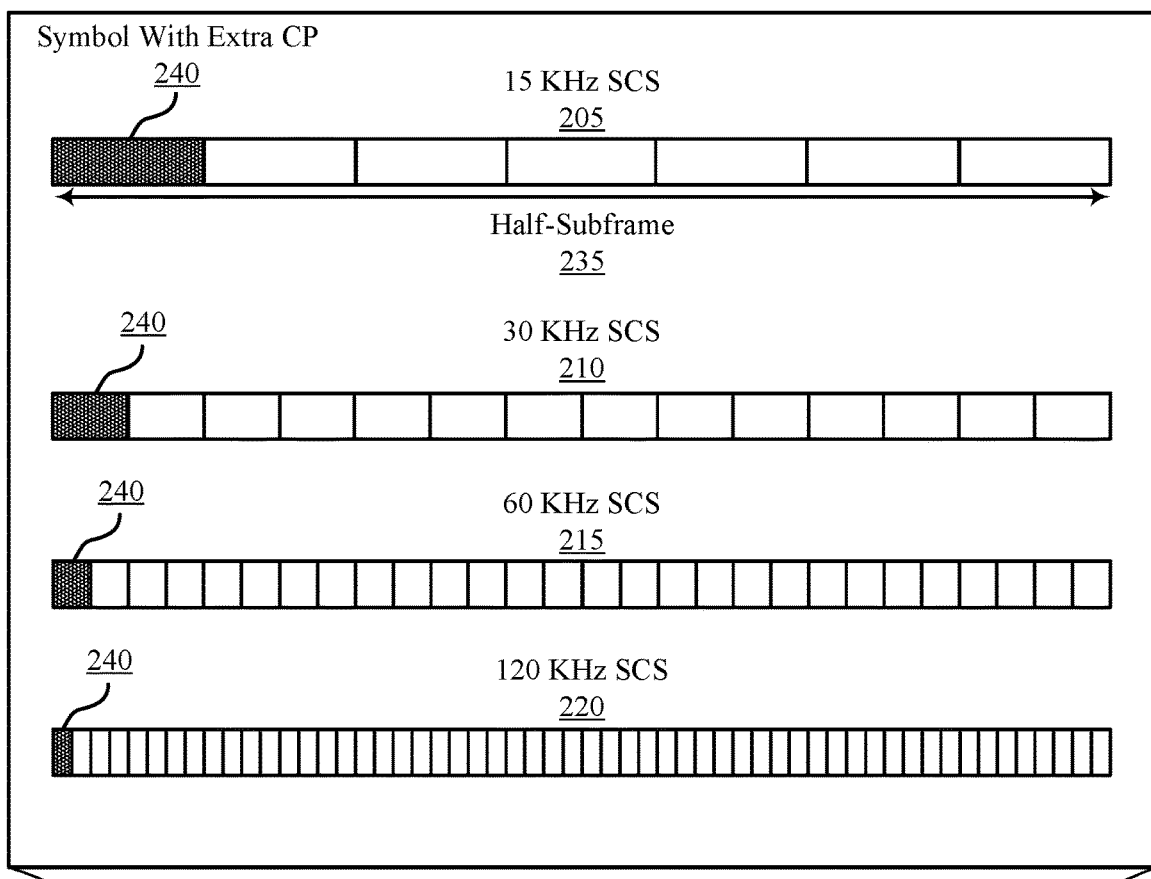
FIG. 2 illustrates an example of a wireless communications system that supports sending reference signals during symbol padding in accordance with aspects of the present disclosure.
Figure 2:
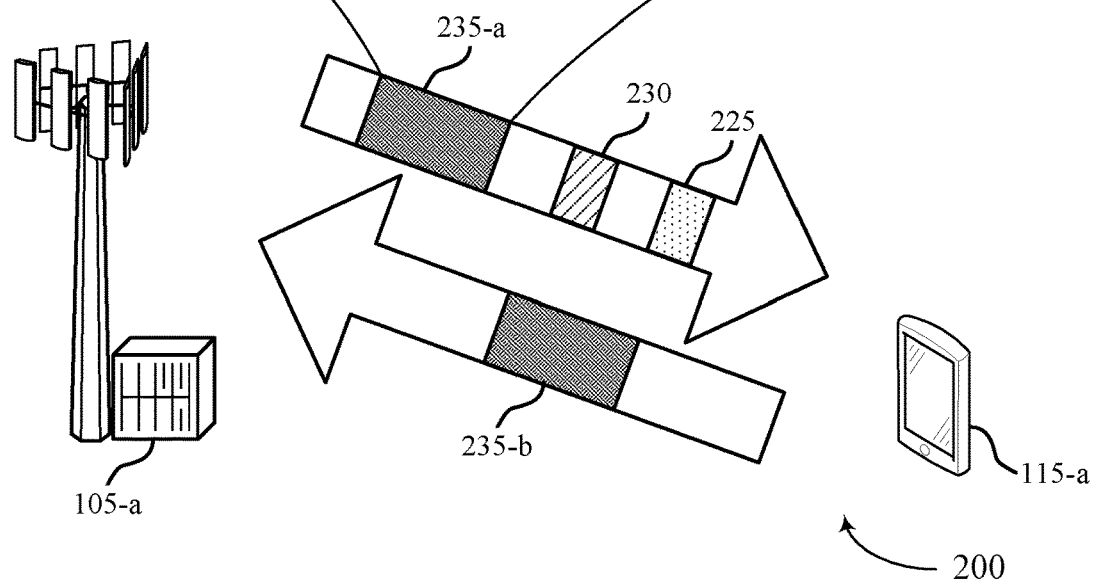

FIG. 2 illustrates an example of a wireless communications system 200 that supports sending reference signals during symbol padding in accordance with aspects of the present disclosure. The wireless communications system 200 may implement aspects of, or be an example of, a wireless communications system 100 as described with reference to FIG. 1. The wireless communications system 200 may include a UE 115-*a* and a base station 105-*a*, which may be respective examples of a UE 115 and a base station 105.

The UE 115-*a* and the base station 105-*a* may communicate according to one or multiple different SCS configurations. The duration of symbol period or the duration of a slot, or both, may change based on the used SCS configuration. For example, with a 15 KHz SCS configuration 205, a half-subframe 235 (e.g., 0.5 milliseconds) may include seven symbols. A 30 KHz SCS configuration 210 may include fourteen symbols. For example, with double the subcarrier spacing, there may be two times as many symbols in the same time period, or the symbol period duration may be halved if the SCS doubles. Similarly, a 60 KHz SCS configuration 215 may have 28 symbols in 0.5 milliseconds, and a 120 KHz SCS configuration 220 may have 56 symbols in 0.5 milliseconds.

In some cases, each half-subframe 235 may be configured to have an integer number of symbols and symbol boundaries occur at the boundaries of the half-subframe. For example, there may be an integer number of symbol and symbol boundaries each 0.5 milliseconds, or the duration of the half-subframe. A half-subframe 235 may be configured as such for any SCS configuration, from the 15 KHz SCS configuration 205 to the 120 KHz SCS configuration 220 or higher.

To achieve an integer number of symbols and symbol boundaries, the wireless communications system 200 may support a padding duration in a first symbol 240 of each half-subframe 235. For example, during a first symbol 250 of any half-subframe 235 (e.g., at a 0.5 millisecond interval), there may be some additional time domain resources such that the integer number of symbols align within the half-subframe 235 with an integer number of symbol boundaries. For example, in the half-subframe of 0.5 milliseconds, there may be a padding duration of approximately 520 nanoseconds in the first symbol 240 of the half-subframe 235. The first symbol 240 of each SCS may have the padding duration, regardless of SCS configuration. Table 1 shows example configurations for a half-subframe in a slot at some SCS configurations. As shown, the extra padding is a wasted resource which includes even more time resources than what is dedicated to cyclic prefix (CP) for each symbol at some higher SCS configurations.

TABLE 1

Symbol, Cyclic Prefix, and extra padding duration up to 240 KHz SCS

| SCS | # of Symbols per 0.5 ms | Symbol Length | CP Length | Padding Length |
|---|---|---|---|---|
| 15 KHz | 7 | 66.67 μsec | 4.69 μsec | 0.52 μsec |
| 30 KHz | 14 | 33.3 μsec | 2.34 μsec | 0.52 μsec |
| 60 KHz | 28 | 16.7 μsec | 1.17 μsec | 0.52 μsec |
| 120 KHz | 56 | 8.33 μsec | 0.59 μsec | 0.52 μsec |
| 240 KHz | 112 | 4.17 μsec | 0.29 μsec | 0.52 μsec |

Some wireless systems may use a fixed Fast Fourier Transform (FFT) size of 4 k, such that symbol duration and normal cyclic prefix duration scale down with SCS. However, the duration for the extra padding duration may be constant, even at higher SCS. At higher SCS configurations, the padding duration may span at least the duration of a symbol period. For example, at 1920 KHz, the extra padding duration may span the same amount of time as a symbol period, and the extra padding duration may span two symbol periods at 3840 KHz. Some configurations and duration values for higher SCS configurations are shown by Table 2, where Tc is equal to $$\frac{1}{480 \text{ KHz} * 4096},$$

or approximately 0.509 nanoseconds.

TABLE 2

Symbol, Cyclic Prefix, and extra padding duration at higher SCS

| SCS (KHz) | NFFT | Max BW (GHz) | Chip duration | Symbol duration | Normal CP + extra padding |
|---|---|---|---|---|---|
| 480 | 4096 | 1.97 | Tc | 4096Tc | 288Tc + 1024Tc |
| 960 | 4096 | 3.93 | Tc/2 | 2048Tc | 144Tc + 1024Tc |
| 1920 | 4096 | 7.86 | Tc/4 | 1024Tc | 72Tc + 1024Tc |
| 3840 | 4096 | 15.73 | Tc/8 | 512Tc | 36Tc + 1024Tc |

Some systems may use the padding duration to transmit additional cyclic prefix information. For example, the first symbol 240 may include a normal cyclic prefix, an information portion, and the padding duration including additional or excess cyclic prefix information (e.g., excess cyclic prefix bits). At higher SCS, such as 1920 KHz and 3840 KHz, the extra CP length (e.g., the normal cyclic prefix and extra padding duration together) may be 107% of a symbol duration and 207% of a symbol duration, respectively. The padding duration may be relatively small (e.g., 0.1% of overhead in a 0.5 millisecond slot), but the padding duration may still be a wasted overhead. Additionally, the UE 115-a may change the symbol boundary and window for each half-subframe 235.

The wireless communications system 200 provides techniques to efficiently utilize the padding duration in a first symbol 240 of a half-subframe 235. For example, the padding duration may be reused for other signaling, such as a reference signal, feedback messages, or retransmission requests. Additionally, or alternatively, the padding duration may be used to indicate parameters for upcoming signaling (e.g., waveform parameters for a symbol period later in the half-subframe 235). These techniques may be utilized by a wireless device in the wireless communications system 200, such as the UE 115-a or the base station 105-a, or both. For example, the UE 115-a may transmit a signal with a half-subframe 235-a, or the base station 105-a may transmit a signal with a half-subframe 235-b, or both. The UE 115-a may use the techniques described herein for efficient signaling and resource utilization during the padding duration in the half-subframe 235-b, and the base station 105-a may use the techniques described herein for efficient signaling and resource utilization during the half-subframe 235-a.

In an example, a device may transmit a reference signal during the padding duration of the first symbol 240 of a half-subframe 235. Transmitting a reference signal during the padding duration may provide additional reference signal instances, which may improve parameter estimates. For example, the reference signal may be a demodulation reference signal (DMRS) used for channel estimation, a phase tracking reference signal (PTRS) for phase tracking, a CSI-RS for reference signal received power (RSRP) estimation, among other types of reference signals. There may be multiple possible configurations to align the reference signal within the padding boundary. Some examples of the different configurations are described in more detail with reference to FIG. 4. The reference signal may be transmitted using a multi-carrier waveform, such as an OFDM or DFT-s-OFDM waveform, or using a single-carrier waveform, such as quadrature amplitude modulation (QAM) or phase shift keying (PSK).

In some cases, signaling during the padding duration of the first symbol 240 of the half-subframe 235 may indicate information about a waveform or waveform properties in upcoming symbols. For example, a reference signal, or parameters of a reference signal, may indicate waveform parameters of one or more symbols later in the half-subframe. In some cases, the reference signal may indicate a waveform type (e.g., a single-carrier waveform, multi-carrier waveform, etc.), a beam configuration, a precoder configuration, a bandwidth part configuration or allocation information, a symbol allocation (e.g., a slot or subframe format), or any combination thereof.

In some cases, a receiving device may determine an index to a table of configured sets of waveform parameters based on the reference signal or reference signal parameters. For example, the receiving device may determine the index based on a sequence of samples transmitted in the reference signal, a cyclic shift of the sequence, a length of the sequence, a sample duration of the reference signal, a frequency hopping of the signal, a type of the sequence (e.g., a root used to generate the sequence, etc.), and a location of the reference signal within the padding duration. The receiving device may determine an index of a table of different sets of waveform parameters based on the reference signal or reference signal characteristics to identify a set of waveform parameters. The set of waveform parameters may be used for one or more symbols later in the TTI, slot, half-subframe 235, etc.

In some cases, the network may overwrite a waveform parameter indication by sending another message. For example, the base station 105-a may initially indicate a location of a first set of waveform parameters by transmitting a reference signal during the padding duration of the first symbol 240 of the half-subframe 235 to indicate the first set of waveform parameters. The network may update the waveform parameters or overwrite the waveform indication through additional control signaling. For example, before the symbol occurs where the set of waveform parameters are implemented, the base station 105-a may send control signaling to the UE 115-a. For example, the base station 105-a may send DCI, a MAC CE, or RRC signaling, to overwrite the originally indicated set of waveform parameters or update the originally indicated set of waveform parameters. This may provide more dynamic waveform indication based on varying or dynamic conditions (e.g., changing channel conditions, etc.). The padding-based indication may be used as a first waveform resource allocation by the base station 105-a, and the base station 105-a may change the first waveform resource allocation during the half-subframe based on dynamic conditions.

In some cases, the padding duration may be used by the UE 115-a to transmit signaling which indicates acknowledgment feedback for a received transmission. For example, the UE 115-a may send a reference signal which indicates ACK/NACK feedback in response to a received transmission during the padding duration. Additionally, or alternatively, the base station 105-a may transmit signaling during the padding duration to indicate a retransmission request to the UE 115-a. For example, the reference signal may indicate a retransmission request to the UE 115-a. Indicating the feedback message or the retransmission request via transmitting a reference signal during a padding duration may provide reduced latency for feedback signaling and retransmission request signaling. For example, the UE 115-a may be supported to indicate feedback, or the base station 105-a may be supported to indicate a retransmission request, at the start of each half-subframe (e.g., start of each 0.5 millisecond interval).

In some cases, either the presence or absence of the reference signal, a type of signal transmitted, resources used to transmit the signal, or any combination thereof, may be used to indicate or signal the feedback or retransmission request. For example, the contents of the reference signal, characteristics of the reference signal, or characteristics of resources or configurations used to transmit the reference signal, may indicate either an ACK or a NACK from the UE 115-a or a retransmission request from the base station 105-a.

In an example, the base station 105-a may transmit signaling 225 with configuration information to the UE 115-a for the UE 115-a to communicate in the wireless communications system 200. For example, in some cases, the base station 105-a may transmit signaling indicating one or more SCS configurations for the wireless communications system 200. The SCS configuration may include a configuration for a TTI including a set of multiple symbols, a corresponding set of multiple cyclic prefixes, and a padding duration. This SCS configuration may indicate the SCS and configuration for a half-subframe in the wireless communications system 200. For example, the signaling 225 may indicate which SCS configuration (e.g., from 15 KHz SCS configuration 205 to 120 KHz SCS configuration 220, or higher) is used for communications between UE 115-a and base station 105-a.

The base station 105-a may transmit control signaling 230 indicating a configuration for the padding duration. For example, the configuration may indicate that at least a portion of the padding duration is to be reallocated for a reference signal that indicates a set of one or more waveform parameters for one or more symbols of the TTI after the padding duration. For example, the configuration may indicate whether the padding duration is configured to be used for transmission of a reference signal (e.g., from the UE 115-a or from the base station 105-a). In some cases, the configuration may indicate whether the reference signal is used to indicate a set of waveform parameters which may be used for communications later in the TTI (e.g., later in the half-subframe 235). In some cases, the configuration may indicate whether the reference signal is supported to indicate feedback information (e.g., from the UE 115-a) or retransmission request information (e.g., from the base station 105-a).

The UE 115-a, or the base station 105-a, may transmit a reference signal during at least a portion of the padding duration. The UE 115-a and the base station 105-a may communicate during one or more symbol periods of the TTI (e.g., the half-subframe 235) according to the set of one or more waveform parameters indicated by the reference signal.

Figure 3:
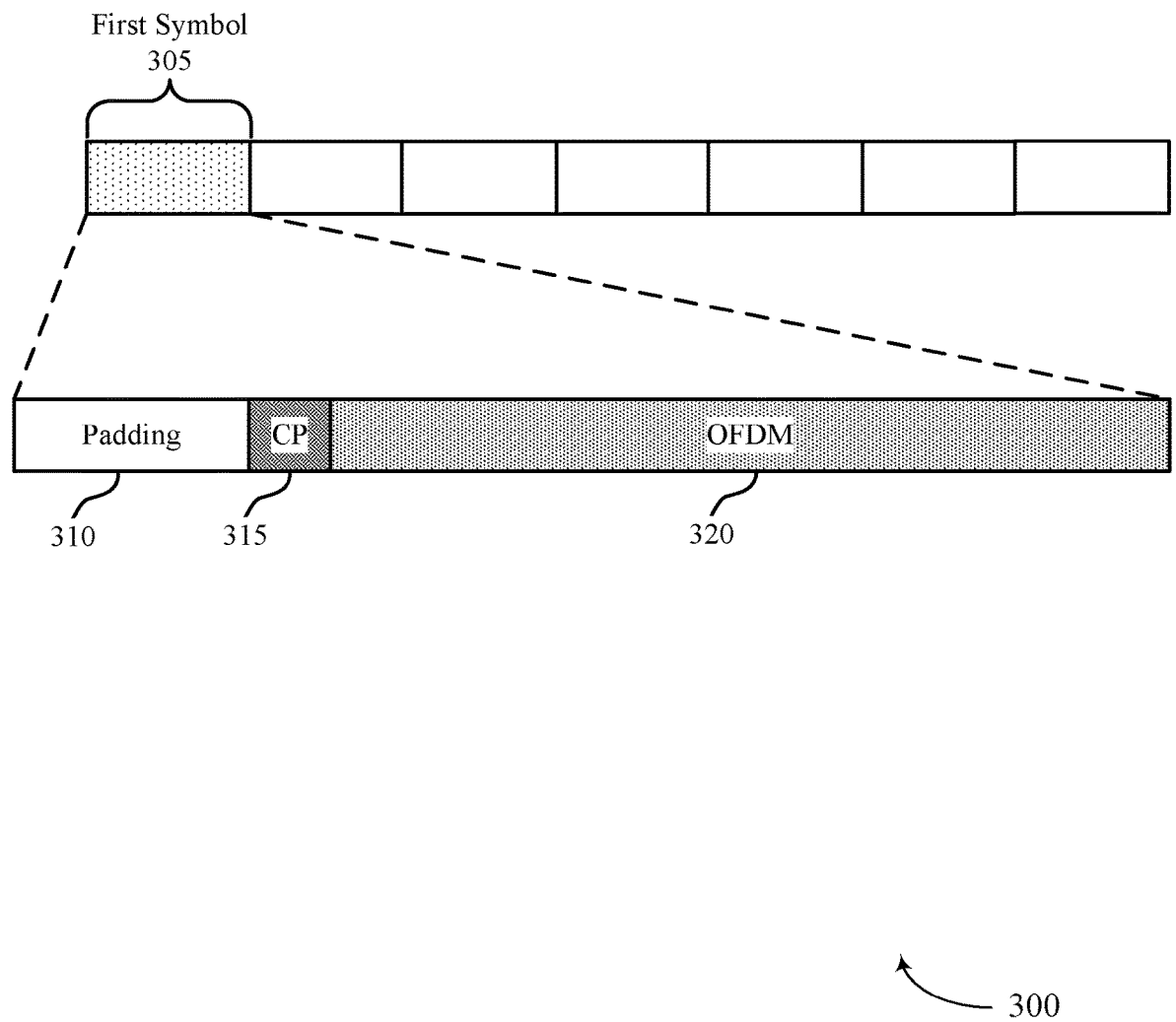
FIG. 3 illustrates an example of a symbol period configuration that supports sending reference signals during symbol padding in accordance with aspects of the present disclosure.

FIG. 3 illustrates an example of a symbol period configuration 300 that supports sending reference signals during symbol padding in accordance with aspects of the present disclosure.

The symbol period configuration 300 may be an example of a configuration for a first symbol in a TTI such as a half-subframe. The symbol period configuration 300 may be an example of a symbol period configuration for a 15 KHz SCS configuration, which may have seven symbol periods in a half-subframe duration.

In some wireless systems, a first symbol 305 may include a padding duration 310, a cyclic prefix duration 315, and an information duration 320. Other symbols (e.g., other than the first symbol 305) may include a cyclic prefix duration and an information duration 320, but not the padding duration 310. The padding duration 310 may be included in the first symbol 305 of a half-subframe to have an integer number of symbol and symbol boundaries align within the half-subframe.

Some systems may use the padding duration 310 for extra cyclic prefix information. For example, in some systems, the padding duration 310 and the cyclic prefix duration 315 may be used to send cyclic prefix information. However, in higher SCS configurations, the padding duration 310 may stay the same length while the length of the first symbol 305 is shorter. Therefore, the padding duration 310 may be a larger portion of the first symbol 305 at higher SCS configurations. For example, in 1920 KHz SCS configurations, the padding duration 310 may be the same length as the information duration 320.

Techniques described herein provide for a wireless device, such as a UE 115 or a base station 105, to transmit a reference signal during the padding duration 310. For example, at higher SCS configurations, the wireless device may transmit a reference signal during the padding duration 310. The reference signal may be used for enhanced channel estimation, phase tracking, or beam management. In some cases, the reference signal may indicate waveform parameters for signaling in a later symbol of a TTI including the first symbol 305.

Figure 4:
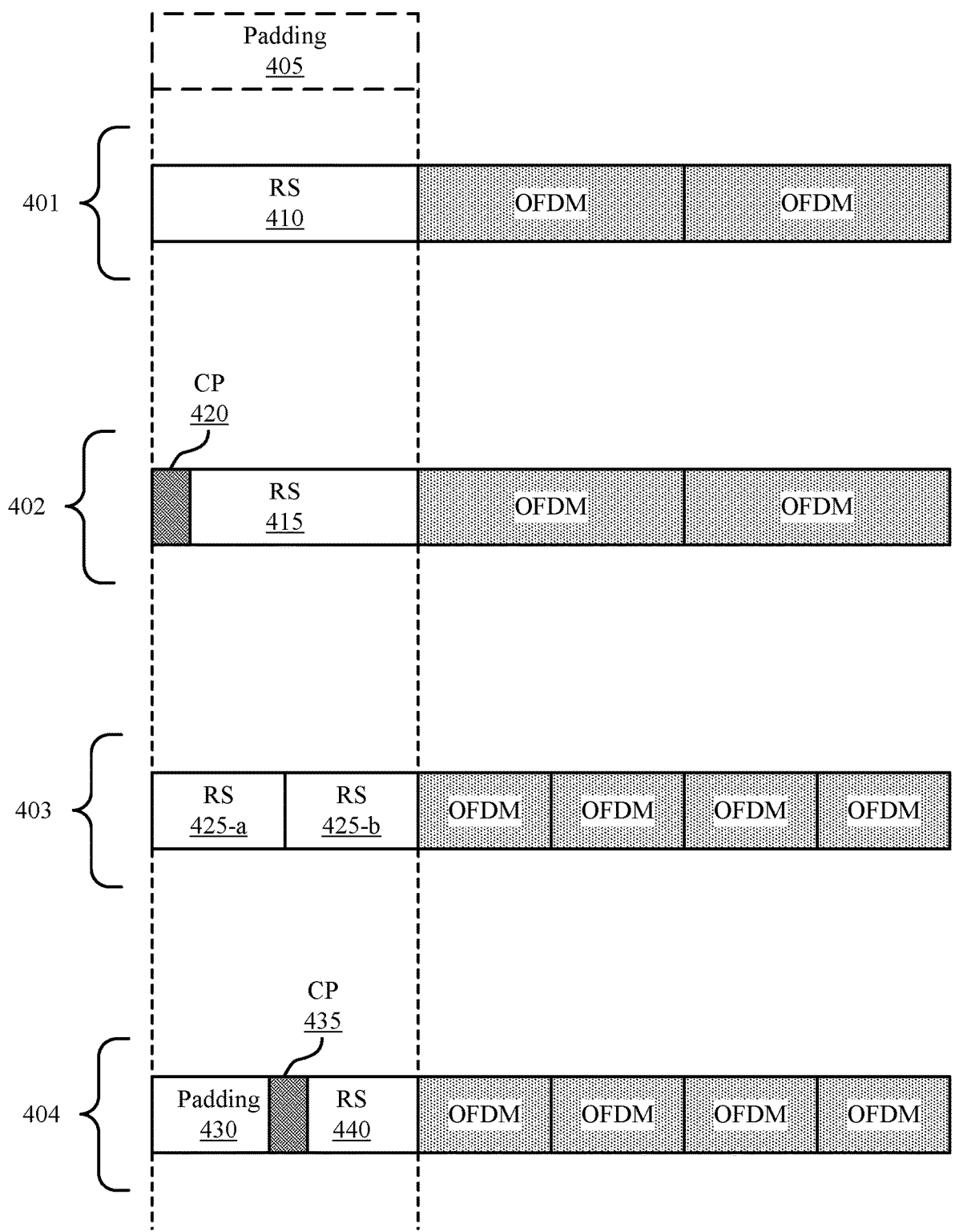
FIG. 4 illustrates an example of a padding duration configuration that supports sending reference signals during symbol padding in accordance with aspects of the present disclosure.

FIG. 4 illustrates an example of a padding duration configuration 400 that supports sending reference signals during symbol padding in accordance with aspects of the present disclosure.

A wireless device, such as a UE 115 or a base station 105, may transmit one or more reference signals during a padding duration 405 of a first symbol of a TTI, such as a half-subframe. The reference signal may be, for example, a PTRS, a DMRS, a CSI-RS, or another type of reference signal. Having more copies of a reference signal may lead to enhanced system performance, providing improved estimation or more opportunities for estimation. For example, transmitting a PTRS may provide enhance phase tracking, transmitting a DMRS may provide enhanced channel estimation, and transmitting a CSI-RS may provide enhanced RSRP estimation (e.g., for beam switching, among other uses).

In some cases, a configuration for the extra reference signal transmissions may be associated with or based on another configuration. For example, the configuration for the extra reference signal transmission may be implicitly or explicitly indicated by or configured with another configuration. Additionally, or alternatively, a configuration for the reference signal may reuse a configuration for a different reference signal or symbol. For example, one or more parameters for a reference signal transmitted during a padding duration 310 may reuse one or more parameters for a different reference signal or a following symbol. In some cases, some parameters may be configured for the reference signal statically or semi-statically ahead of transmission of the reference signal. Some parameters may be indicated in a prior configuration via RRC signaling, DCI, or a MAC CE, and some parameters may be indicated during a reference signal indication.

For example, some properties of a reference signal transmitted during the padding duration 310 may be fixed or semi-statically configured. When the padding duration 310 occurs, and the reference signal is communicated, a UE 115 may determine how to decode, process, or generate the reference signal based on the fixed or semi-static parameters. For example, the fixed or semi-static parameters may include a BWP configuration of the BWP used to transmit the reference signal in relation to a BWP of a next few symbols (e.g., are they the same BWP or different), a location of the reference signal in frequency (e.g., does the reference signal span the BWP or a subset of subcarriers of the BWP), a transmit power for the reference signal, a beam and precoder in relation to another symbol, or any combination thereof. The fixed or semi-statically configured parameters may be configured via RRC signaling, DCI, a MAC CE, or any combination thereof.

Some parameters for a reference signal transmitted during a padding duration may be based on parameters for other signals or symbols. For example, a UE 115 or base station 105, or both, may determine a beam and precoder configuration for the reference signal transmitted during the padding duration 310 based on a beam and precoder configuration for another symbol or reference signal. In some cases, using a same parameter as an upcoming reference signal (e.g., a DMRS in a following slot, CSI-RS, PTRS, etc.), such as a same beam or precoder, or both, may reduce overhead when signaling a configuration for the reference signal. In some cases, the reference signal during the padding duration 310 may be indicated to have a same beam and precoder as a following reference signal based on being indicated to have a same transmission configuration indicator (TCI) state. For example, a base station 105 may indicate to a UE 115 that the reference signal transmitted during the padding duration 310 of the first symbol 305 may have a same TCI state as a DMRS in a second symbol. The UE 115 may determine a beam and precoder for the reference signal based on the indication of the TCI state. In another example, the reference signal may be configured to have a same beam and precoder as an upcoming OFDM symbol. The association between the reference signal and the upcoming OFDM symbol may be configured by RRC or dynamically.

In some cases, these techniques may be implemented for higher SCS configurations, such as 1920 KHz SCS configurations or 3840 KHz SCS configurations. A first configuration 401 and a second configuration 402 may be examples of configurations with a 1920 KHz SCS configuration. A third configuration 403 and a fourth configuration 404 may be examples of configurations with a 3840 KHz SCS configuration. In a 1920 KHz SCS configuration, the padding duration 405 may span a same length as one symbol period. In a 3840 KHz SCS configuration, the padding duration 405 may span a same length as two symbol periods.

Multiple configurations may be supported to align the reference signal within a boundary of the padding duration 405. In a first example, reference signals may be transmitted during the padding duration 405 without a cyclic prefix. For example, in a first configuration 401, a reference signal 410 may be transmitted without a cyclic prefix. For example, without a cyclic prefix, in 1920 KHz SCS configurations, one symbol (e.g., one reference signal) may be transmitted. For example, in the first configuration 401, the wireless device may transmit a reference signal 410 without a cyclic prefix. In 3840 KHz SCS configurations, two symbols (e.g., two reference signals) may be transmitted. For example, in the third configuration 403, the wireless device may transmit reference signal 425-a and reference signal 425-b during the padding duration 405.

In a second example, each reference signal may be shorter than a symbol, and the wireless device may append a cyclic prefix to the shortened reference signal. For example, a smaller FFT size or zero-ended sequence may be used to generate a shorter symbol, and the wireless device may leave some space (e.g., available bits) to add cyclic prefix information. For 1920 KHz SCS configurations, one or more symbols may be transmitted, and for 3840 KHZ SCS configurations, two or more symbols may be transmitted according to the second example. For example, for the second configuration 402, the wireless device may transmit cyclic prefix information 420 and a reference signal 415 during the padding duration 405.

In a third example, one or more symbols of reference signals (e.g., with or without a cyclic prefix) may be transmitted, and any remaining padding duration may be used for other signaling or techniques. For example, any remaining padding duration may be used for additional cyclic prefix information. Additionally, or alternatively, the wireless device may perform power management, such as to handle power transients due to power changes. Additionally, or alternatively, a UE 115 or a base station 105, or other wireless devices either transmitting or receiving the reference signal, may perform noise and interference measurements. For example, in the fourth configuration 404, the wireless device may transmit a reference signal 440 with a cyclic prefix 435, and there may be a remaining portion of padding 430. In some cases, the wireless device may transmit additional cyclic prefix information in the remaining portion of padding 430, perform noise and interference measurements, or handle power transients.

In some cases, the wireless device may be configured to either use the padding duration 405 to communicate a reference signal or to continue using the padding duration 405 as extra padding. For example, the wireless device may use the padding duration 405 to communicate a reference signal when configured to communicate according to an SCS with is greater than or equal to 1920 KHz. Otherwise, the wireless device may use the padding duration 405 as extra padding, which may be used for excess cyclic prefix information. If the wireless device determines to operate according to a mode where the padding duration is used for other signaling or techniques, the wireless device may operate according to one or more of the above examples.

Figure 5:
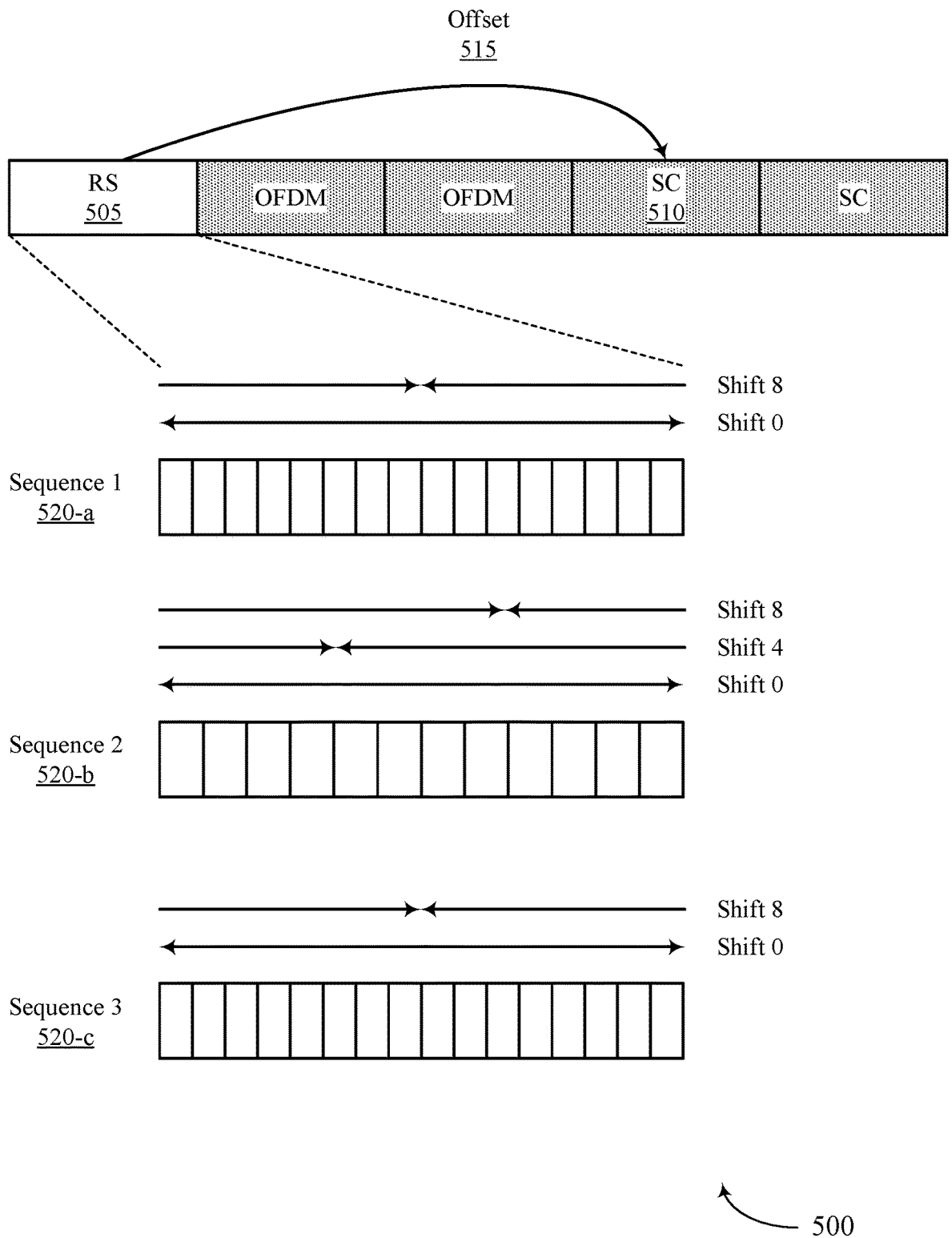
FIG. 5 illustrates an example of a waveform parameter indication scheme that supports sending reference signals during symbol padding in accordance with aspects of the present disclosure.

FIG. 5 illustrates an example of a waveform parameter indication scheme 500 that supports sending reference signals during symbol padding in accordance with aspects of the present disclosure.

The waveform parameter indication scheme 500 may be implemented by a wireless device, such as a UE 115 or a base station 105, or both, which is configured to communicate a reference signal 505 during a padding duration of a first symbol of a TTI. For example, a UE 115 or a base station 105 may be configured to transmit a reference signal during a first symbol of a half-subframe, which may occur at 0.5 millisecond intervals. At higher SCS configurations, the padding duration may span one or multiple symbol period durations.

In some cases, the reference signal transmitted during the padding duration may indicate information about a waveform or waveform properties in upcoming symbols. For example, the reference signal 505 may indicate a set of one or more waveform parameters for one or more upcoming symbols, including at least an upcoming symbol 510.

For example, the reference signal 505 may indicate that a single carrier waveform transmission or reception will begin X symbols from the current slot (e.g., with the reference signal 505). Both an offset 515, or X, and the signaled waveform may be configurable. For example, the reference signal 505 may indicate that the waveform used for signaling at the upcoming symbol 510 may be a multi-carrier waveform (e.g., OFDM or DFT-s-OFDM, or the like) or a single carrier waveform (e.g., PSK or QAM, or the like). Additionally, the offset 515 may be configurable. For example, the offset 515 may be configured via DCI, RRC signaling, MAC CE, UCI, or other types of control signaling. In some cases, the offset 515 may be indicated based on the reference signal 505, such as a sequence, characteristic, configuration, or parameter of the reference signal 505.

In some cases, the offset 515 may be zero. For example, a next symbol (e.g., a symbol after the reference signal 505) may be communicated according to the indicated set of one or more waveform parameters. In some cases, if the offset 515 is zero, the receiving device may apply a gap of a number of samples or symbols to account for a waveform switching delay. In some cases, the gap may be based on a UE capability, such as a UE capability to perform waveform switching.

The reference signal 505 may indicate a set of waveform parameters which may be used for one or more later symbols, such as the symbol 510. For example, the reference signal 505 may signal a change to waveform properties starting from the symbol 510. For example, the set of waveform parameters may include a waveform type (e.g., a type of multi-carrier waveform or a type of single carrier waveform), a bandwidth part, a beam configuration, a precoder configuration, a symbol allocation, or any combination thereof. For example, the set of waveform parameters may indicate that, starting from symbol 510, the signaling may be on an indicated bandwidth part, using an indicated waveform, and with an indicated directional format (e.g., an uplink and downlink directional pattern for at least the symbol 510).

In some cases, one or more parameters or characteristics of the reference signal 505 may be used to signal or indicate the set of one or more waveform parameters. For example, the roots used to generate the sequence of samples transmitted, a duration or location of the reference signal 505 within the padding duration, a hopping pattern of the reference signal 505 in frequency, or any combination thereof. In some cases, a cyclic shift of a sequence forming the reference signal 505, a length of the sequence, a sample duration of the sequence or the reference signal 505, a frequency hopping configuration of the sequence or the reference signal 505, a sequence type, a location of the reference signal within the padding duration, or any combination thereof, may indicate or signal the one or more waveform parameters.

In some cases, a device transmitting the reference signal 505 or a device receiving the reference signal 505, or both, may be configured with a table of sets of waveform parameters. Based on the reference signal 505, the transmitting device may indicate an index to a table of sets of waveform parameters, and the receiving device may determine the index to the table. The table may include different sets of waveform parameters for different combinations of parameters or characteristics described herein, which may correspond to different waveforms or waveform parameters, or both, for the symbol 510. In some cases, each row of the table may correspond to one type of configuration of the reference signal 505 which may be signaled to indicate a set of waveform parameters from multiple sets of waveform parameters. For example, a device receiving the reference signal 505 may determine the one or more waveform parameters based on a table similar to Table 3 below. Table 3 is one possible example of a table of sets of waveform parameters. In other examples, different reference signal parameters may be used, and different, or more, or fewer types of waveform parameters may be indicated via the Table 3.

TABLE 3

Sequence, Length, Shift and Waveform Signaled

| Sequence | Length (samples) | Shift | Waveform signaled |
|---|---|---|---|
| 1 | 16 | 0 | OFDM, BWP-1 |
| 1 | 16 | 8 | OFDM, BWP-2 |
| 2 | 12 | 0 | SC, BWP-3 |
| 2 | 12 | 4 | SC, BWP-4 |
| 2 | 12 | 8 | SC, BWP-5 |
| 3 | 16 | 0 | DFT-s-OFDM, BWP-6 |
| 3 | 16 | 8 | DFT-s-OFDM, BWP-7 |

For example, the reference signal 505 may include a first sequence 520-a (e.g., sequence 1). The first sequence 520-a may have 16 samples and be transmitted with either a cyclic shift of 0 or a cyclic shift of 8. The first sequence 520-a, when transmitted with a cyclic shift of 0, may indicate a first waveform or first set of waveform parameters. For example, the first sequence 520-a transmitted with a cyclic shift of 0 may indicate an OFDM waveform on a first bandwidth part (e.g., BWP-1). The first sequence 520-a transmitted with a cyclic shift of 8 may indicate an OFDM waveform on a second bandwidth part (e.g., BWP-2).

In another example, the reference signal 505 may include a second sequence 520-*b* (e.g., sequence 2). The second sequence 520-*b* may have 12 samples and be transmitted with a cyclic shift of 0, 4, or 8. In an example, based on the cyclic shift of the reference signal 505 with the second sequence 520-*b*, the transmitting device may indicate different sets of waveform parameters for the symbol 510, such as a bandwidth part for communicating the symbol 510 and a waveform type used to transmit signaling on the symbol 510. In another example, the reference signal 505 may include a third sequence 520-*c* (e.g., sequence 3). Based on the characteristics or parameters of the third sequence 520-*c*, the transmitting device may indicate sets of waveform parameters from the table.

In some cases, the transmitting device may indicate a subset of waveform parameters. For example, the transmitting device and the receiving device may be configured to communicate according to a first set of waveform parameters, and the reference signal may indicate values for a subset of parameters from the first set of waveform parameters. For example, one or a few waveform parameters may be indicated via the reference signal 505. The receiving device may communicate during the symbol 510 according to the original set of waveform parameters and the updated values for the subset of parameters. For example, the reference signal 505 may indicate just a specific bandwidth part for the symbol 510. The receiving device may communicate according to an originally scheduled configuration for the symbol but on the indicated bandwidth part. For example, the indicated parameters may be updated, and other parameters may not be updated or may use an originally scheduled or previous configuration. In some examples, the SCS configuration may be indicated via one or more messages, such as one or more RRC messages, MAC CE messages, DCI messages, or any combination thereof. For example, the base station 105-*b* may transmit one or more DCI messages or one or more RRC messages, or both, to configure a BWP for the UE 115-*b*.

In some examples, the network may overwrite an indicated set of waveform parameters by transmitting other signaling. For example, a base station 105 may indicate a first set of waveform parameters to a UE 115 based on the reference signal 505. The base station 105 may transmit control signaling, such as DCI, RRC signaling, or a MAC CE, to indicate a second set of waveform parameters, which may overwrite the first set of waveform parameters at the UE 115. For example, the padding duration-based indication (e.g., via the reference signal 505) may be used as an initial or waveform resource allocation by the base station 105, and the base station 105 may update the waveform resource allocation or configuration based on dynamic or changing conditions. For example, the base station 105 may change a bandwidth part, waveform type, etc., for the symbol 510 after transmitting the reference signal 505 and indicating an initial configuration for a waveform used for the symbol 510.

Figure 6:
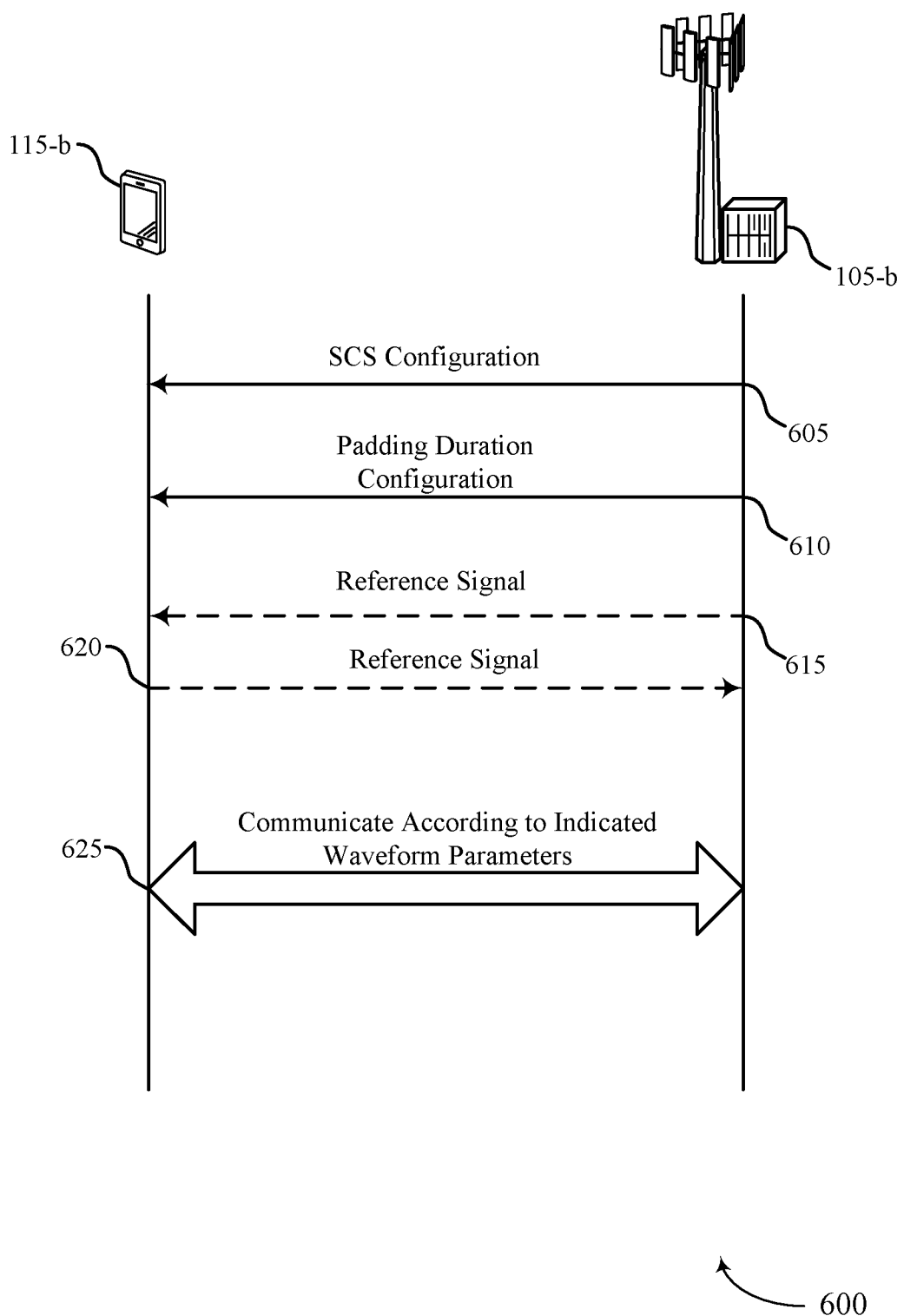
FIG. 6 illustrates an example of a process flow that supports sending reference signals during symbol padding in accordance with aspects of the present disclosure.

FIG. 6 illustrates an example of a process flow 600 that supports sending reference signals during symbol padding in accordance with aspects of the present disclosure. The process flow 600 may be implemented by a UE 115-*b* or a base station 105-*b*, or both, which may be respective examples of a UE 115 and a base station 105 as described with reference to FIG. 1. In some cases, some operations or signaling of the process flow 600 may occur in a different order than shown by FIG. 6. Additionally, or alternatively, some other signaling or operations may be performed or some signaling or operations may be removed, or both.

At 605, the UE 115-*b* may receive an indication of an SCS for communications in a TTI that includes a set of multiple symbols, a corresponding set of multiple cyclic prefixes, and a padding duration. The symbol duration of the set of multiple symbols may be based on the SCS, and the padding duration may be at least as long as the symbol duration. For example, a half-subframe may be an example of the TTI. In some cases, the SCS may be high enough that the padding duration spans a same duration of time as one or two symbol periods. For example, the SCS may be 1920 KHz or 3840 KHz, such that the padding duration spans one or two symbol periods. In some cases, the UE 115-*b* may transmit an indication of a UE capability to receive reference signals during padding durations.

At 610, the UE 115-*b* may receive a control signal indicating a configuration for the padding duration. The configuration may indicate that at least a portion of the padding duration is to be reallocated for a reference signal that indicates a set of one or more waveform parameters for one or more symbols of the TTI after the padding duration. For example, the UE 115-*b* may be configured to transmit or receive the reference signal during the padding duration.

In some cases, the control signal may configure the UE 115-*b* to transmit or receive the reference signal according to a configuration as described with reference to FIG. 4. For example, the UE 115-*b* may be configured to transmit or receive one or more reference signals without a cyclic prefix. In some cases, the UE 115-*b* may be configured to transmit or receive a shortened reference signal (e.g., a reference signal which is shorter than a symbol) with a cyclic prefix. In some cases, the UE 115-*b* may be configured to transmit or receive a reference signal with or without a cyclic prefix, and the UE 115-*b* may be configured to use any remaining portion of the cyclic prefix for other signaling or processes. For example, the UE 115-*b* or the base station 105-*b*, or both, may be configured to handle power transients or perform noise and interference measurements, or both, during the remaining portion of the padding duration.

In some cases, at 615, the UE 115-*b* may receive the reference signal during the portion of the padding duration according to the configuration. Additionally, or alternatively, the UE 115-*b* may transmit the reference signal during the portion of the padding duration at 620.

The UE 115-*b* may determine the set of one or more waveform parameters based on the reference signal. In some cases, the UE 115-*b* may receive an indication of a table of multiple sets of waveform parameters. The reference signal may indicate an index to an entry of the table that identifies a set of waveform parameters from multiple sets of waveform parameters in the table. In some cases, the UE 115-*b* may determine the set of one or more waveform parameters based on a cyclic shift of the reference signal, a length of a sequence forming the reference signal, a sample duration of the reference signal, a frequency hopping pattern of the reference signal, a sequence type of the sequence forming the reference signal, a location of the reference signal within the padding duration, or any combination thereof.

The reference signal may indicate information about a waveform and waveform properties in upcoming symbols. For example, the reference signal may indicate the set of waveform parameters that are used for communications during the one or more symbols of the TTI. In some cases, the set of one or more waveform parameters may include a waveform type, a bandwidth part, a beam or beam configuration, a precoder or precoder configuration, a symbol allocation, or any combination thereof.

At 625, the UE 115-*b* and the base station 105-*b* may communicate during the one or more symbols of the TTI after the padding duration according to the set of one or more waveform parameters indicated by the received reference signal. For example, the UE 115-*b* and the base station 105-*b* may communicate according to the indicated waveform type, bandwidth part, beam, precoder, symbol allocation, or any combination thereof, during the one or more symbols.

In some cases, the reference signal transmitted at 615 or 620 may indicate feedback information or a retransmission request. For example, the base station 105-*b* may indicate a retransmission request to the UE 115-*b* based on the reference signal transmitted at 615. For example, a configuration or characteristic of the reference signal may indicate the retransmission request to the UE 115-*b*. Similarly, the UE 115-*b* may indicate acknowledgment feedback for a received transmission to the base station 105-*b* based on the reference signal transmitted at 620. Indicating the acknowledgment feedback or retransmission request through the reference signal may provide lower latency for sending feedback or a retransmission request.

Figure 7:
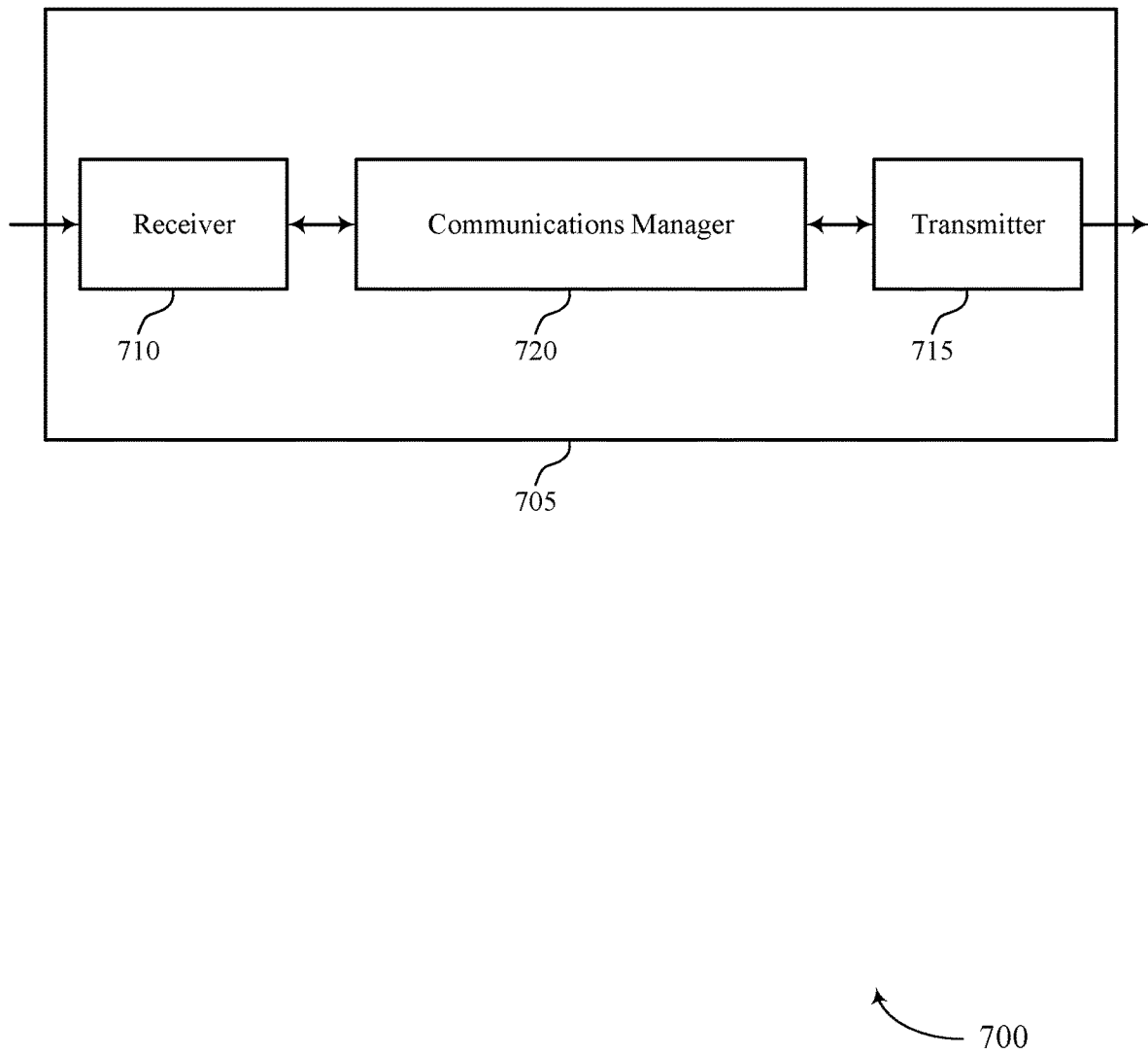
FIGS. 7 and 8 show block diagrams of devices that support sending reference signals during symbol padding in accordance with aspects of the present disclosure.

FIG. 7 shows a block diagram 700 of a device 705 that supports sending reference signals during symbol padding in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sending reference signals during symbol padding). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sending reference signals during symbol padding). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of sending reference signals during symbol padding as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The communications manager 720 may be configured as or otherwise support a means for receiving a control signal indicating a configuration for the padding duration, where the configuration indicates that at least a portion of the padding duration is to be reallocated for a reference signal that indicates a set of one or more waveform parameters for one or more symbols of the TTI after the padding duration. The communications manager 720 may be configured as or otherwise support a means for receiving the reference signal during the portion of the padding duration according to the configuration. The communications manager 720 may be configured as or otherwise support a means for communicating during the one or more symbols of the TTI after the padding duration according to the set of one or more waveform parameters indicated by the received reference signal.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources. For example, these techniques may enable a UE 115 to transmit or receive one or more additional reference signals during a padding duration of a symbol. Utilizing this padding duration for a reference signal may reduce overhead and provide additional instances of a reference signal, which may be used to improve communications quality.

Figure 8:
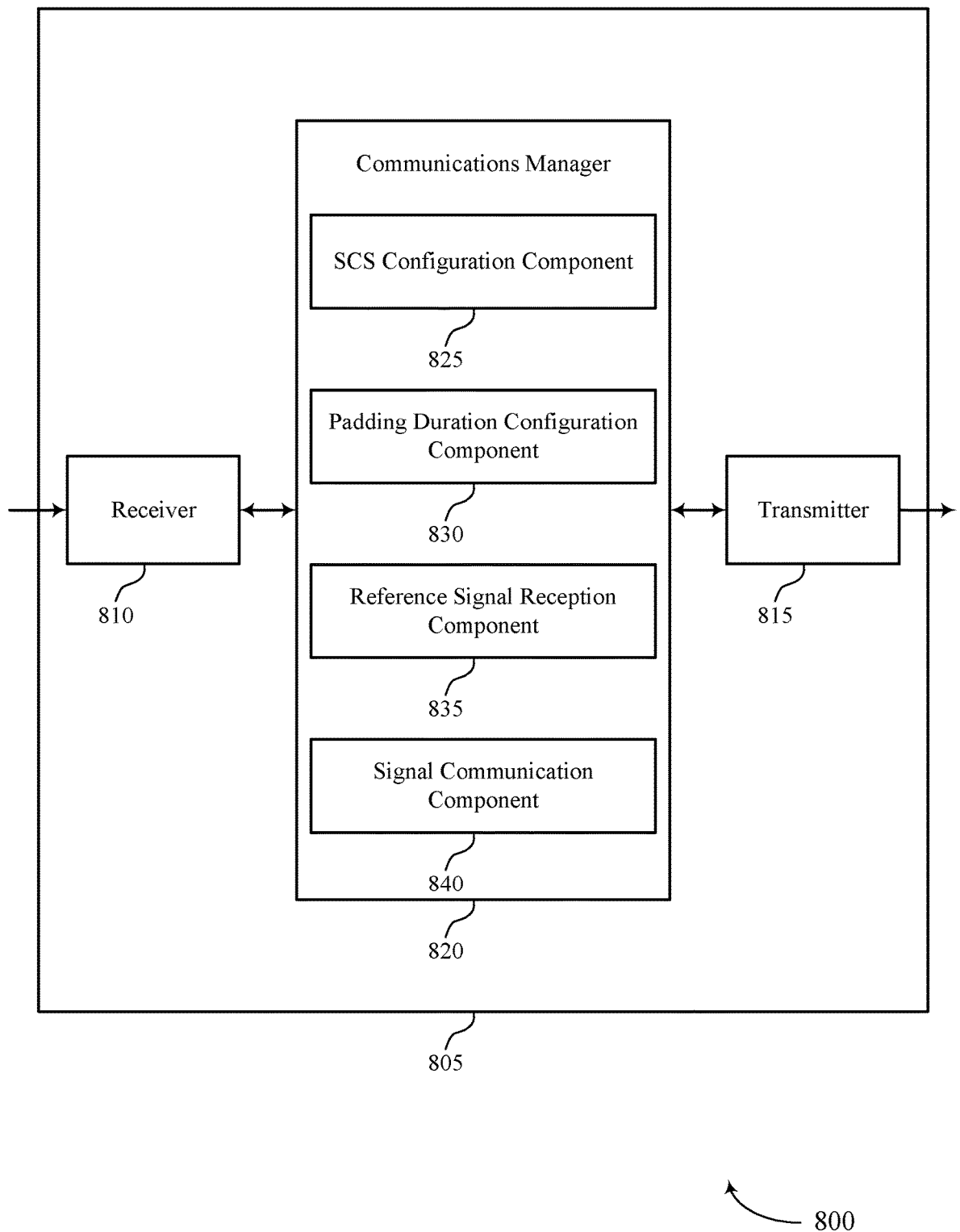

FIG. 8 shows a block diagram 800 of a device 805 that supports sending reference signals during symbol padding in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to sending reference signals during symbol padding). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to sending reference signals during symbol padding). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of sending reference signals during symbol padding as described herein. For example, the communications manager 820 may include an SCS configuration component 825, a padding duration configuration component 830, a reference signal reception component 835, a signal communication component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The SCS configuration component 825 may be configured as or otherwise support a means for receiving an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The padding duration configuration component 830 may be configured as or otherwise support a means for receiving a control signal indicating a configuration for the padding duration, where the configuration indicates that at least a portion of the padding duration is to be reallocated for a reference signal that indicates a set of one or more waveform parameters for one or more symbols of the TTI after the padding duration. The reference signal reception component 835 may be configured as or otherwise support a means for receiving the reference signal during the portion of the padding duration according to the configuration. The signal communication component 840 may be configured as or otherwise support a means for communicating during the one or more symbols of the TTI after the padding duration according to the set of one or more waveform parameters indicated by the received reference signal.

Figure 9:
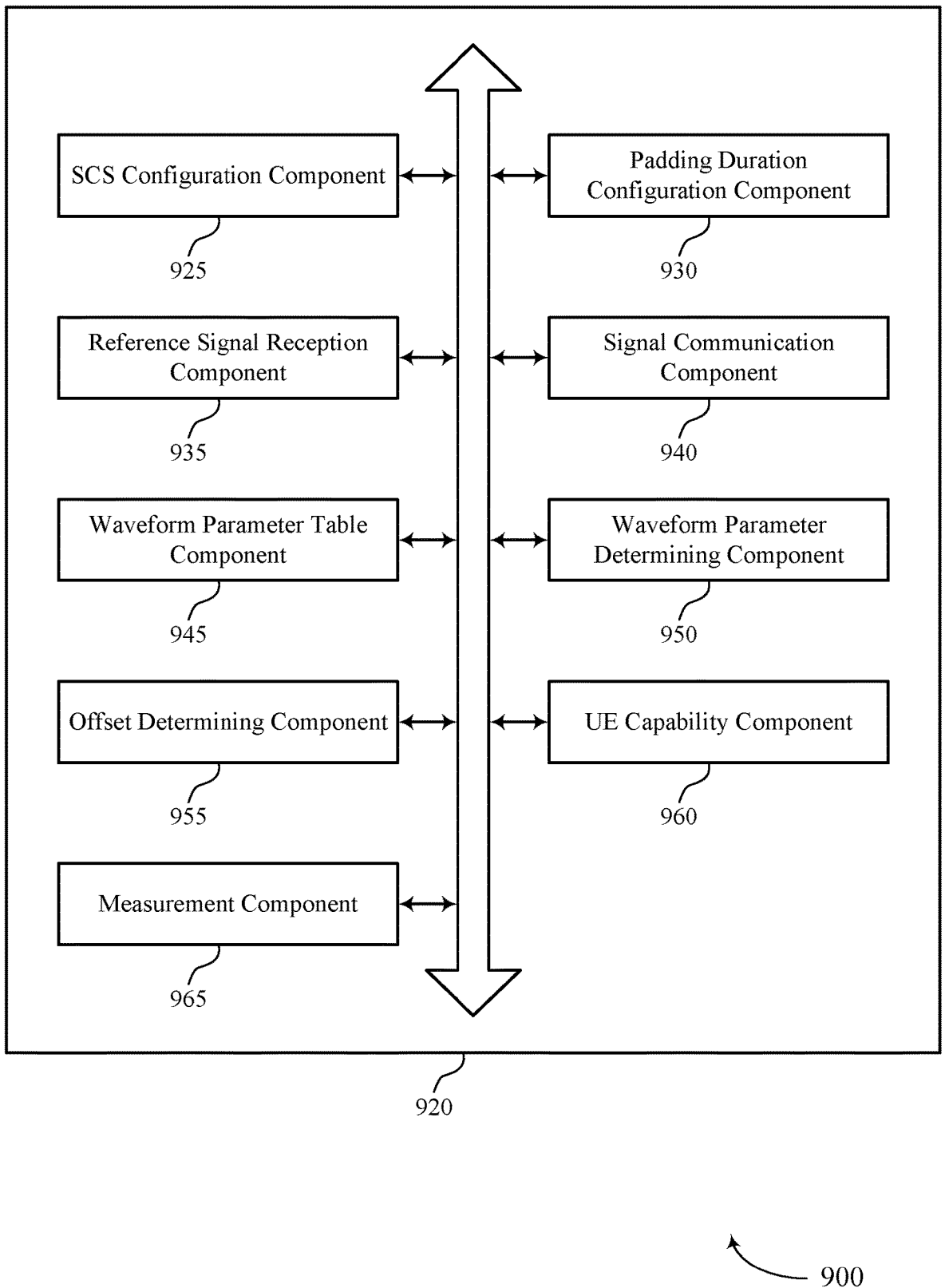
FIG. 9 shows a block diagram of a communications manager that supports sending reference signals during symbol padding in accordance with aspects of the present disclosure.

FIG. 9 shows a block diagram 900 of a communications manager 920 that supports sending reference signals during symbol padding in accordance with aspects of the present disclosure. The communications manager 920 may be an example of aspects of a communications manager 720, a communications manager 820, or both, as described herein. The communications manager 920, or various components thereof, may be an example of means for performing various aspects of sending reference signals during symbol padding as described herein. For example, the communications manager 920 may include an SCS configuration component 925, a padding duration configuration component 930, a reference signal reception component 935, a signal communication component 940, a waveform parameter table component 945, a waveform parameter determining component 950, an offset determining component 955, a UE capability component 960, a measurement component 965, or any combination thereof. Each of these components may communicate, directly or indirectly, with one another (e.g., via one or more buses).

The communications manager 920 may support wireless communication at a UE in accordance with examples as disclosed herein. The SCS configuration component 925 may be configured as or otherwise support a means for receiving an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The padding duration configuration component 930 may be configured as or otherwise support a means for receiving a control signal indicating a configuration for the padding duration, where the configuration indicates that at least a portion of the padding duration is to be reallocated for a reference signal that indicates a set of one or more waveform parameters for one or more symbols of the TTI after the padding duration. The reference signal reception component 935 may be configured as or otherwise support a means for receiving the reference signal during the portion of the padding duration according to the configuration. The signal communication component 940 may be configured as or otherwise support a means for communicating during the one or more symbols of the TTI after the padding duration according to the set of one or more waveform parameters indicated by the received reference signal.

In some examples, the waveform parameter table component 945 may be configured as or otherwise support a means for receiving an indication of a table of a set of multiple sets of waveform parameters, where the reference signal indicates an index to an entry of the table that identifies a set of waveform parameters of the set of multiple sets of waveform parameters for communicating during the one or more symbols of the TTI.

In some examples, the waveform parameter determining component 950 may be configured as or otherwise support a means for determining the set of one or more waveform parameters based on a cyclic shift of the reference signal, a length of a sequence forming the reference signal, a sample duration of the reference signal, a frequency hopping pattern of the reference signal, a sequence type of the sequence forming the reference signal, a location of the reference signal within the padding duration, or any combination thereof.

In some examples, to support communicating according to the set of one or more waveform parameters, the signal communication component 940 may be configured as or otherwise support a means for communicating according to a waveform type, a bandwidth part, a beam, a precoder, a symbol allocation, or any combination thereof, indicated by the set of one or more waveform parameters.

In some examples, to support receiving the control signal indicating the configuration for the padding duration, the offset determining component 955 may be configured as or otherwise support a means for receiving an indication of an offset of zero or more from the reference signal to a first symbol of the one or more symbols of the TTI in which the set of one or more waveform parameters are applied.

In some examples, the offset determining component 955 may be configured as or otherwise support a means for determining the offset based on a waveform switching capability of the UE, where the offset includes one or more samples or one or more symbol periods.

In some examples, to support receiving the reference signal, the reference signal reception component 935 may be configured as or otherwise support a means for receiving the reference signal as a multi-carrier waveform or a single carrier waveform.

In some examples, the UE capability component 960 may be configured as or otherwise support a means for transmitting, to a base station, an indication of a UE capability to receive reference signals during padding durations, where the control signal indicating the configuration for the padding duration is received based on transmitting the UE capability.

In some examples, to support receiving the reference signal, the reference signal reception component 935 may be configured as or otherwise support a means for receiving a phase tracking reference signal, a demodulation reference signal, a channel state information reference signal, or any combination thereof.

In some examples, to support receiving the reference signal, the reference signal reception component 935 may be configured as or otherwise support a means for receiving the reference signal and a cyclic prefix for the reference signal during the portion of the padding duration, where the reference signal spans a shorter time duration than a symbol period based on the SCS.

In some examples, to support receiving the reference signal, the reference signal reception component 935 may be configured as or otherwise support a means for receiving a set of multiple reference signals during the portion of the padding duration based on the SCS of the TTI.

In some examples, the reference signal reception component 935 may be configured as or otherwise support a means for receiving, during a remaining portion of the padding duration, a cyclic prefix associated with one or more of the reference signals, the set of multiple symbols, or the set of multiple cyclic prefixes.

In some examples, the measurement component 965 may be configured as or otherwise support a means for performing a noise and interference measurement on a wireless channel used for the communicating during a remaining portion of the padding duration.

In some examples, to support receiving the reference signal, the reference signal reception component 935 may be configured as or otherwise support a means for receiving an indication of a retransmission request from a base station based on a configuration of the received reference signal.

In some examples, the reference signal reception component 935 may be configured as or otherwise support a means for transmitting, during the portion of the padding duration, an indication of acknowledgement feedback in response to a received downlink message.

In some examples, the waveform parameter determining component 950 may be configured as or otherwise support a means for identifying a first set of waveform parameters applicable to the communicating during the one or more symbols. In some examples, the waveform parameter determining component 950 may be configured as or otherwise support a means for determining a waveform parameter value for one or more waveform parameters of the first set of waveform parameters based on the reference signal. In some examples, the signal communication component 940 may be configured as or otherwise support a means for communicating during the one or more symbols according to the first set of waveform parameters and the waveform parameter value determined based on the reference signal.

Figure 10:
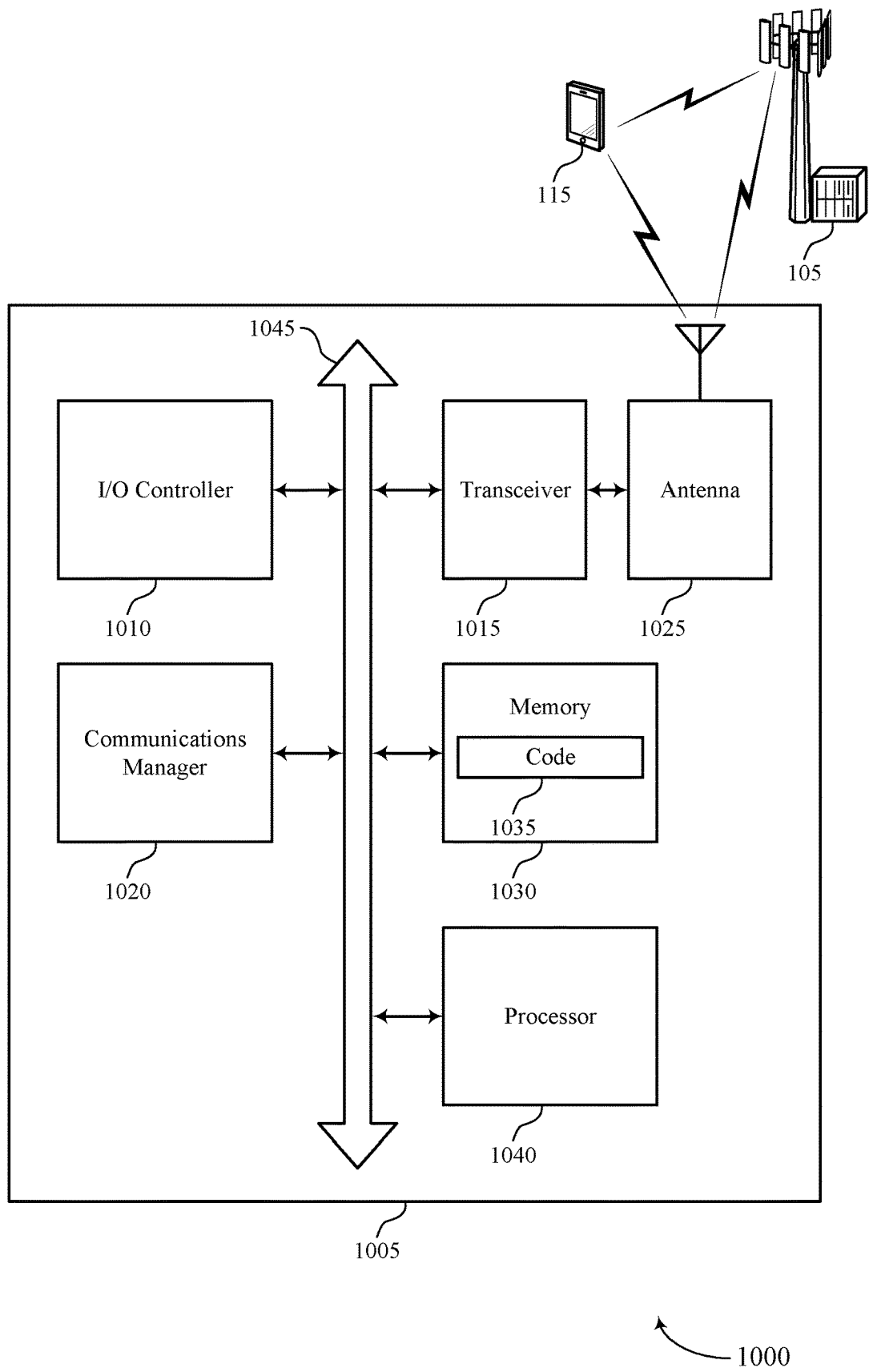
FIG. 10 shows a diagram of a system including a device that supports sending reference signals during symbol padding in accordance with aspects of the present disclosure.

FIG. 10 shows a diagram of a system 1000 including a device 1005 that supports sending reference signals during symbol padding in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting sending reference signals during symbol padding). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The communications manager 1020 may be configured as or otherwise support a means for receiving a control signal indicating a configuration for the padding duration, where the configuration indicates that at least a portion of the padding duration is to be reallocated for a reference signal that indicates a set of one or more waveform parameters for one or more symbols of the TTI after the padding duration. The communications manager 1020 may be configured as or otherwise support a means for receiving the reference signal during the portion of the padding duration according to the configuration. The communications manager 1020 may be configured as or otherwise support a means for communicating during the one or more symbols of the TTI after the padding duration according to the set of one or more waveform parameters indicated by the received reference signal.

By including or configuring the communications manager 1020 in accordance with examples as described herein, the device 1005 may support techniques for reduced latency, more efficient utilization of communication resources, and improved coordination between devices. For example, these techniques may enable a UE 115 to transmit or receive one or more additional reference signals during a padding duration of a symbol. Utilizing this padding duration for a reference signal may reduce overhead and provide additional instances of a reference signal, which may be used to improve communications quality. For example, the reference signal may provide enhanced phase tracking, channel estimation, or power measurements.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of sending reference signals during symbol padding as described herein, or the processor 1040 and the memory 1030 may be otherwise configured to perform or support such operations.

Figure 11:
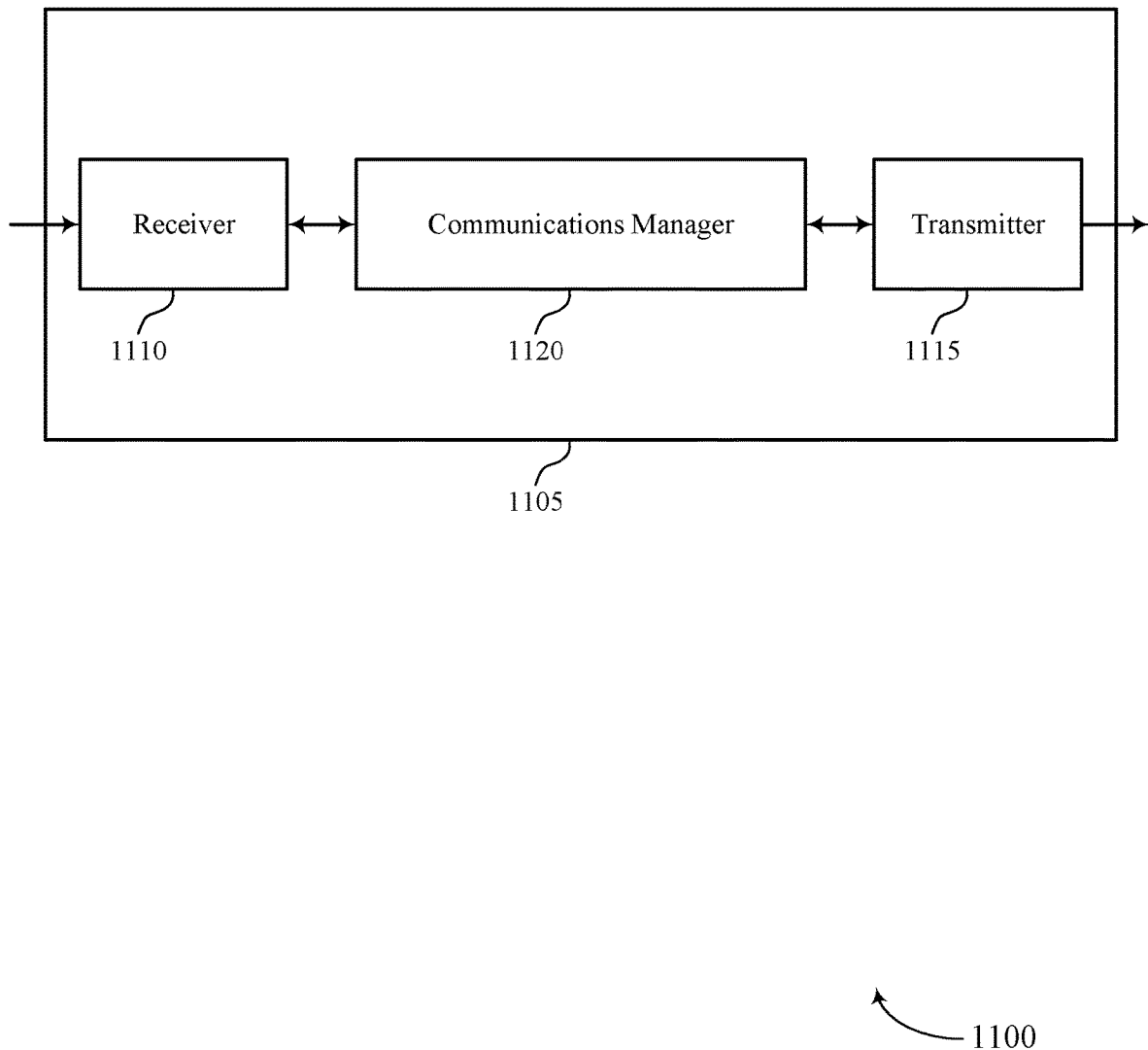
FIGS. 11 and 12 show block diagrams of devices that support sending reference signals during symbol padding in accordance with aspects of the present disclosure.

FIG. 11 shows a block diagram 1100 of a device 1105 that supports sending reference signals during symbol padding in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to sending reference signals during symbol padding). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to sending reference signals during symbol padding). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of sending reference signals during symbol padding as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a UE, an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The communications manager 1120 may be configured as or otherwise support a means for transmitting a control signal indicating a configuration for the padding duration, where the configuration indicates that at least a portion of the padding duration is to be reallocated for a reference signal that indicates a set of one or more waveform parameters for one or more symbols of the TTI after the padding duration. The communications manager 1120 may be configured as or otherwise support a means for transmitting the reference signal during the portion of the padding duration according to the configuration. The communications manager 1120 may be configured as or otherwise support a means for communicating during the one or more symbols of the TTI after the padding duration according to the set of one or more waveform parameters indicated by the transmitted reference signal.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced latency, more efficient utilization of communication resources, and improved coordination between devices. For example, these techniques may enable a base station 105 to transmit or receive additional reference signals during a padding duration of a symbol. Utilizing this padding duration for a reference signal may reduce overhead and provide additional instances of a reference signal, which may be used to improve communications quality. For example, the reference signal may provide enhanced phase tracking, channel estimation, or power measurements.

Figure 12:
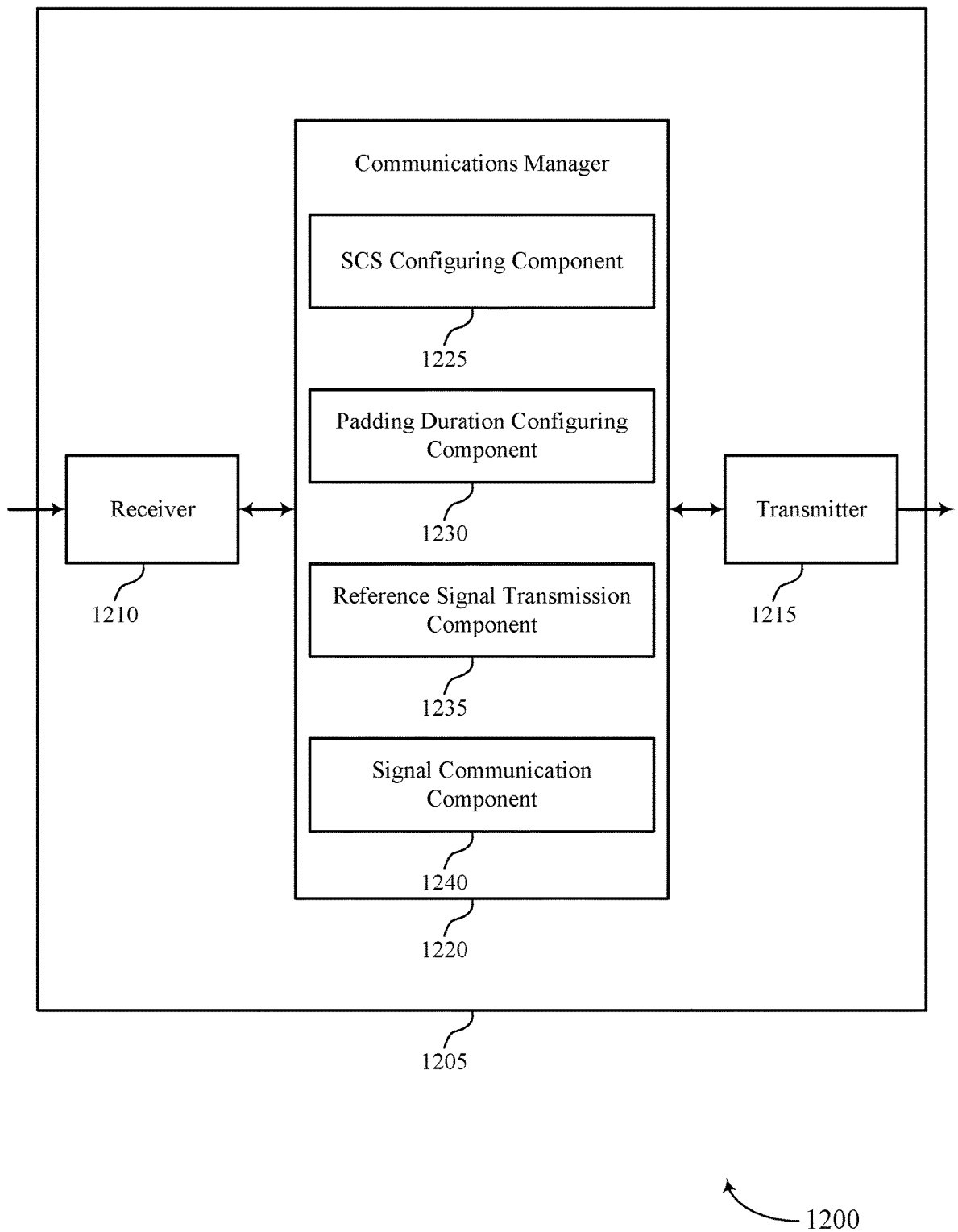

FIG. 12 shows a block diagram 1200 of a device 1205 that supports sending reference signals during symbol padding in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to sending reference signals during symbol padding). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to sending reference signals during symbol padding). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of sending reference signals during symbol padding as described herein. For example, the communications manager 1220 may include an SCS configuring component 1225, a padding duration configuring component 1230, a reference signal transmission component 1235, a signal communication component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The SCS configuring component 1225 may be configured as or otherwise support a means for transmitting, to a UE, an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The padding duration configuring component 1230 may be configured as or otherwise support a means for transmitting a control signal indicating a configuration for the padding duration, where the configuration indicates that at least a portion of the padding duration is to be reallocated for a reference signal that indicates a set of one or more waveform parameters for one or more symbols of the TTI after the padding duration. The reference signal transmission component 1235 may be configured as or otherwise support a means for transmitting the reference signal during the portion of the padding duration according to the configuration. The signal communication component 1240 may be configured as or otherwise support a means for communicating during the one or more symbols of the TTI after the padding duration according to the set of one or more waveform parameters indicated by the transmitted reference signal.

Figure 13:
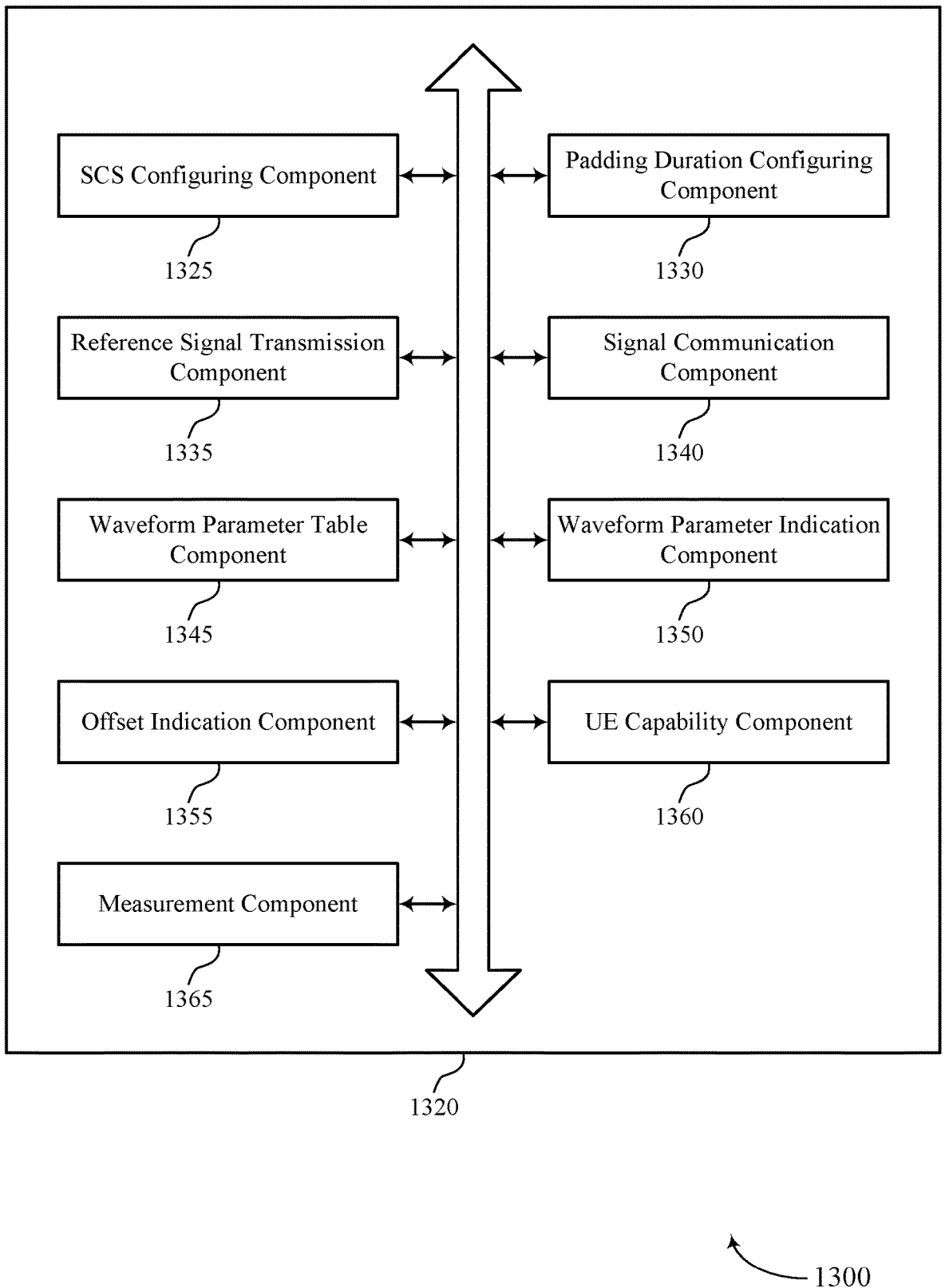
FIG. 13 shows a block diagram of a communications manager that supports sending reference signals during symbol padding in accordance with aspects of the present disclosure.

FIG. 13 shows a block diagram 1300 of a communications manager 1320 that supports sending reference signals during symbol padding in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of sending reference signals during symbol padding as described herein. For example, the communications manager 1320 may include an SCS configuring component 1325, a padding duration configuring component 1330, a reference signal transmission component 1335, a signal communication component 1340, a waveform parameter table component 1345, a waveform parameter indication component 1350, an offset indication component 1355, a UE capability component 1360, a measurement component 1365, or any combination thereof. Each of these components may communicate, directly or indirectly, with one another (e.g., via one or more buses).

The communications manager 1320 may support wireless communication at a base station in accordance with examples as disclosed herein. The SCS configuring component 1325 may be configured as or otherwise support a means for transmitting, to a UE, an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The padding duration configuring component 1330 may be configured as or otherwise support a means for transmitting a control signal indicating a configuration for the padding duration, where the configuration indicates that at least a portion of the padding duration is to be reallocated for a reference signal that indicates a set of one or more waveform parameters for one or more symbols of the TTI after the padding duration. The reference signal transmission component 1335 may be configured as or otherwise support a means for transmitting the reference signal during the portion of the padding duration according to the configuration. The signal communication component 1340 may be configured as or otherwise support a means for communicating during the one or more symbols of the TTI after the padding duration according to the set of one or more waveform parameters indicated by the transmitted reference signal.

In some examples, the waveform parameter table component 1345 may be configured as or otherwise support a means for transmitting an indication of a table of a set of multiple sets of waveform parameters, where the reference signal indicates an index to an entry of the table that identifies a set of waveform parameters of the set of multiple sets of waveform parameters for communicating during the one or more symbols of the TTI.

In some examples, the waveform parameter indication component 1350 may be configured as or otherwise support a means for indicating the set of one or more waveform parameters based on a cyclic shift of the reference signal, a length of a sequence forming the reference signal, a sample duration of the reference signal, a frequency hopping pattern of the reference signal, a sequence type of the sequence forming the reference signal, a location of the reference signal within the padding duration, or any combination thereof.

In some examples, to support communicating according to the set of one or more waveform parameters, the signal communication component 1340 may be configured as or otherwise support a means for communicating according to a waveform type, a bandwidth part, a beam, a precoder, a symbol allocation, or any combination thereof, indicated by the set of one or more waveform parameters.

In some examples, to support transmitting the control signal indicating the configuration for the padding duration, the offset indication component 1355 may be configured as or otherwise support a means for transmitting an indication of an offset from the reference signal to a first symbol of the one or more symbols of the TTI for communicating according to the set of one or more waveform parameters.

In some examples, the UE capability component 1360 may be configured as or otherwise support a means for receiving, from the UE, an indication of a UE capability to receive reference signals during padding durations, where the control signal indicating the configuration for the padding duration is transmitted based on receiving the indication of the UE capability.

In some examples, to support transmitting the reference signal, the reference signal transmission component 1335 may be configured as or otherwise support a means for transmitting the reference signal and a cyclic prefix for the reference signal during the portion of the padding duration, where the reference signal spans a shorter time duration than a symbol period based on the SCS.

In some examples, to support transmitting the reference signal, the reference signal transmission component 1335 may be configured as or otherwise support a means for transmitting a set of multiple reference signals during the portion of the padding duration based on the SCS of the TTI.

In some examples, the reference signal transmission component 1335 may be configured as or otherwise support a means for transmitting, during a remaining portion of the padding duration, a cyclic prefix associated with one or more of the reference signal, the set of multiple symbols, or the set of multiple cyclic prefixes.

In some examples, the measurement component 1365 may be configured as or otherwise support a means for performing a noise and interference measurement on a wireless channel used for the communicating during a remaining portion of the padding duration.

In some examples, to support transmitting the reference signal, the reference signal transmission component 1335 may be configured as or otherwise support a means for transmitting an indication of a retransmission request to the UE based on a configuration of the received reference signal.

In some examples, the reference signal transmission component 1335 may be configured as or otherwise support a means for receiving, during the portion of the padding duration, an indication of acknowledgment feedback in response to a transmitted downlink message.

Figure 14:
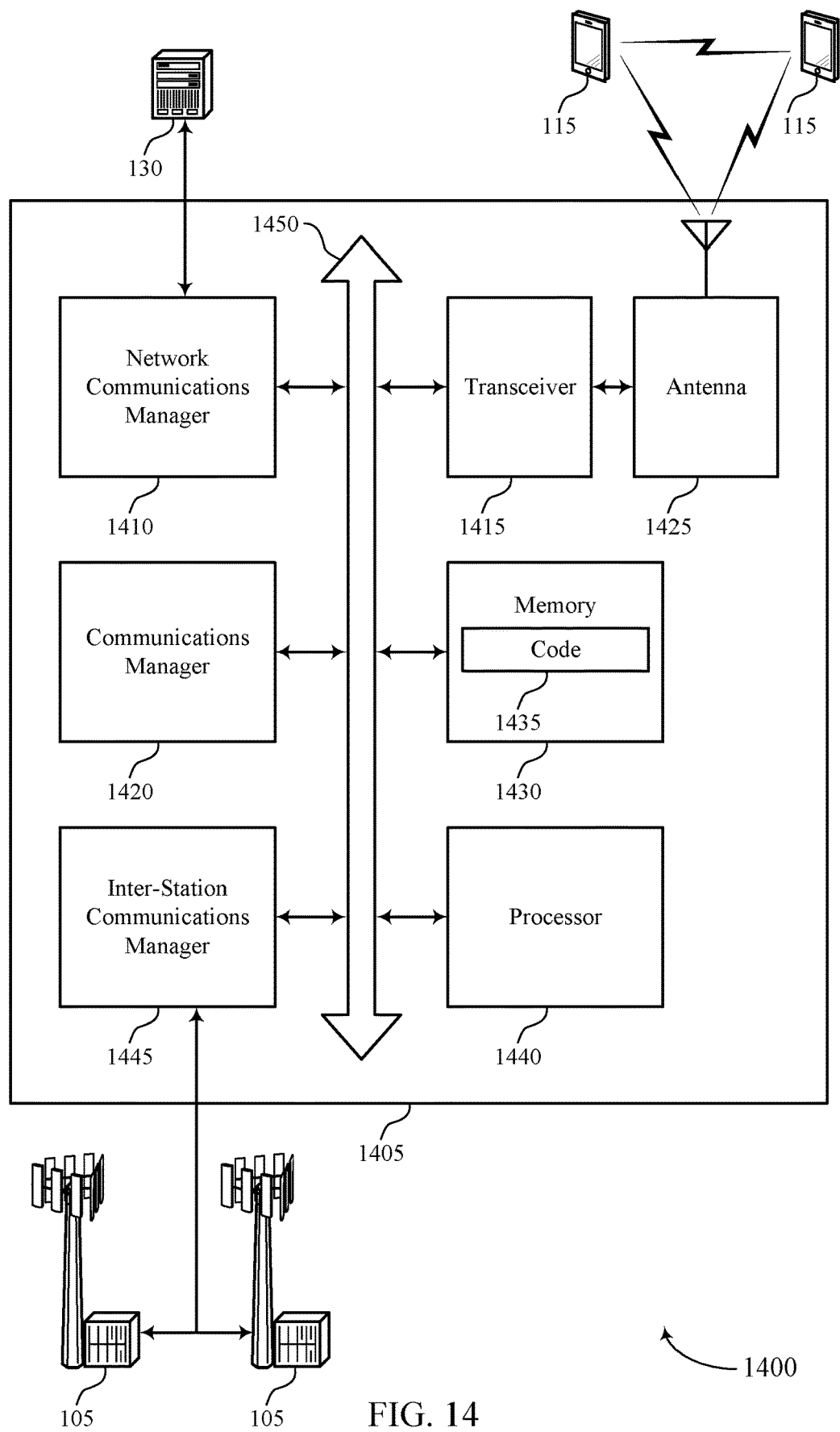
FIG. 14 shows a diagram of a system including a device that supports sending reference signals during symbol padding in accordance with aspects of the present disclosure.

FIG. 14 shows a diagram of a system 1400 including a device 1405 that supports sending reference signals during symbol padding in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting sending reference signals during symbol padding). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a UE, an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The communications manager 1420 may be configured as or otherwise support a means for transmitting a control signal indicating a configuration for the padding duration, where the configuration indicates that at least a portion of the padding duration is to be reallocated for a reference signal that indicates a set of one or more waveform parameters for one or more symbols of the TTI after the padding duration. The communications manager 1420 may be configured as or otherwise support a means for transmitting the reference signal during the portion of the padding duration according to the configuration. The communications manager 1420 may be configured as or otherwise support a means for communicating during the one or more symbols of the TTI after the padding duration according to the set of one or more waveform parameters indicated by the transmitted reference signal.

By including or configuring the communications manager 1420 in accordance with examples as described herein, the device 1405 may support techniques for reduced latency, more efficient utilization of communication resources, and improved coordination between devices. For example, these techniques may enable a base station 105 to transmit or receive additional reference signals during a padding duration of a symbol. Utilizing this padding duration for a reference signal may reduce overhead and provide additional instances of a reference signal, which may be used to improve communications quality. For example, the reference signal may provide enhanced phase tracking, channel estimation, or power measurements.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of sending reference signals during symbol padding as described herein, or the processor 1440 and the memory 1430 may be otherwise configured to perform or support such operations.

Figure 15:
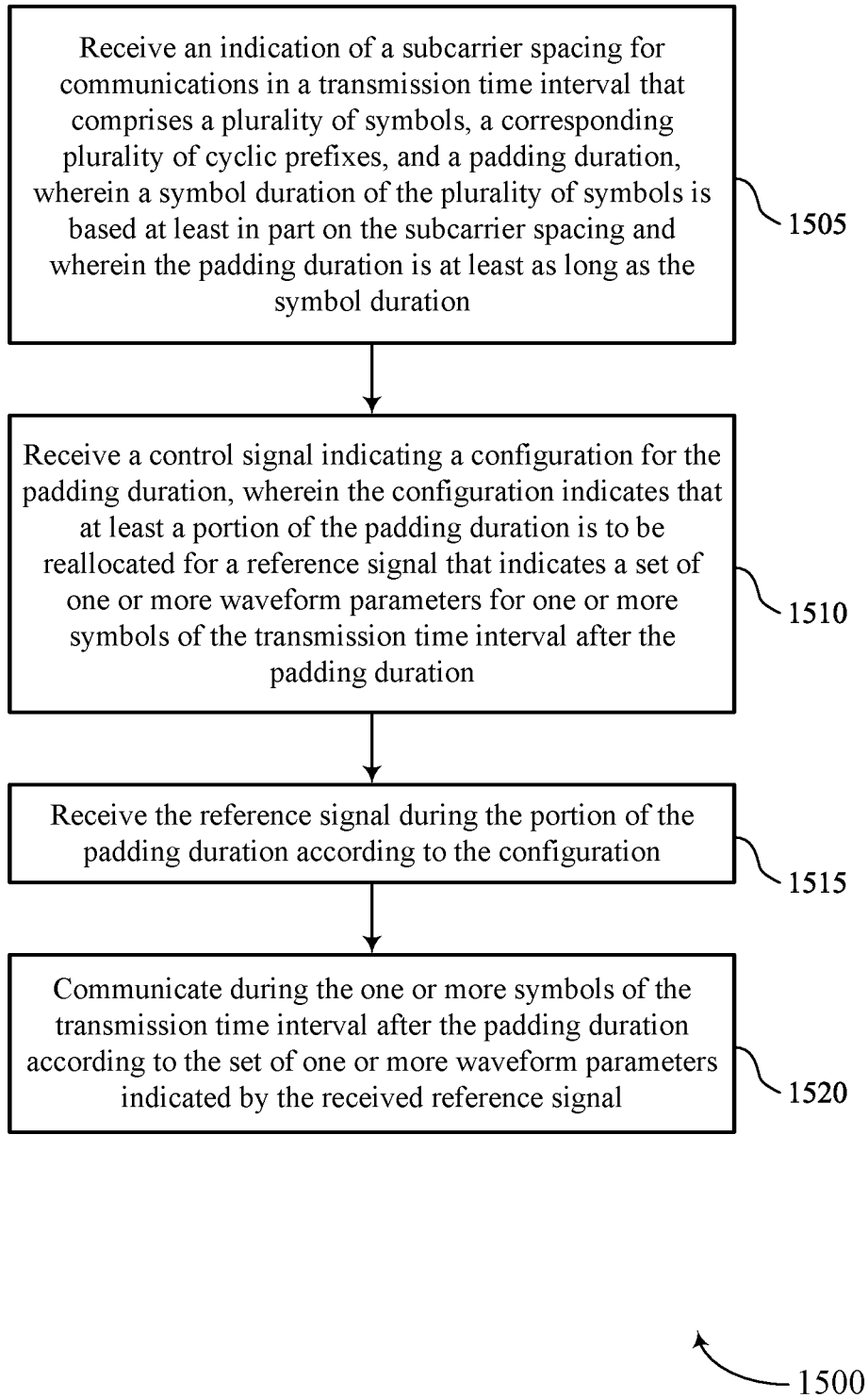
FIGS. 15 through 19 show flowcharts illustrating methods that support sending reference signals during symbol padding in accordance with aspects of the present disclosure.

FIG. 15 shows a flowchart illustrating a method 1500 that supports sending reference signals during symbol padding in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The operations of 1505 may be performed in accordance with examples as disclosed herein. In some examples, aspects of the operations of 1505 may be performed by an SCS configuration component 925 as described with reference to FIG. 9.

At 1510, the method may include receiving a control signal indicating a configuration for the padding duration, where the configuration indicates that at least a portion of the padding duration is to be reallocated for a reference signal that indicates a set of one or more waveform parameters for one or more symbols of the TTI after the padding duration. The operations of 1510 may be performed in accordance with examples as disclosed herein. In some examples, aspects of the operations of 1510 may be performed by a padding duration configuration component 930 as described with reference to FIG. 9.

At 1515, the method may include receiving the reference signal during the portion of the padding duration according to the configuration. The operations of 1515 may be performed in accordance with examples as disclosed herein. In some examples, aspects of the operations of 1515 may be performed by a reference signal reception component 935 as described with reference to FIG. 9.

At 1520, the method may include communicating during the one or more symbols of the TTI after the padding duration according to the set of one or more waveform parameters indicated by the received reference signal. The operations of 1520 may be performed in accordance with examples as disclosed herein. In some examples, aspects of the operations of 1520 may be performed by a signal communication component 940 as described with reference to FIG. 9.

Figure 16:
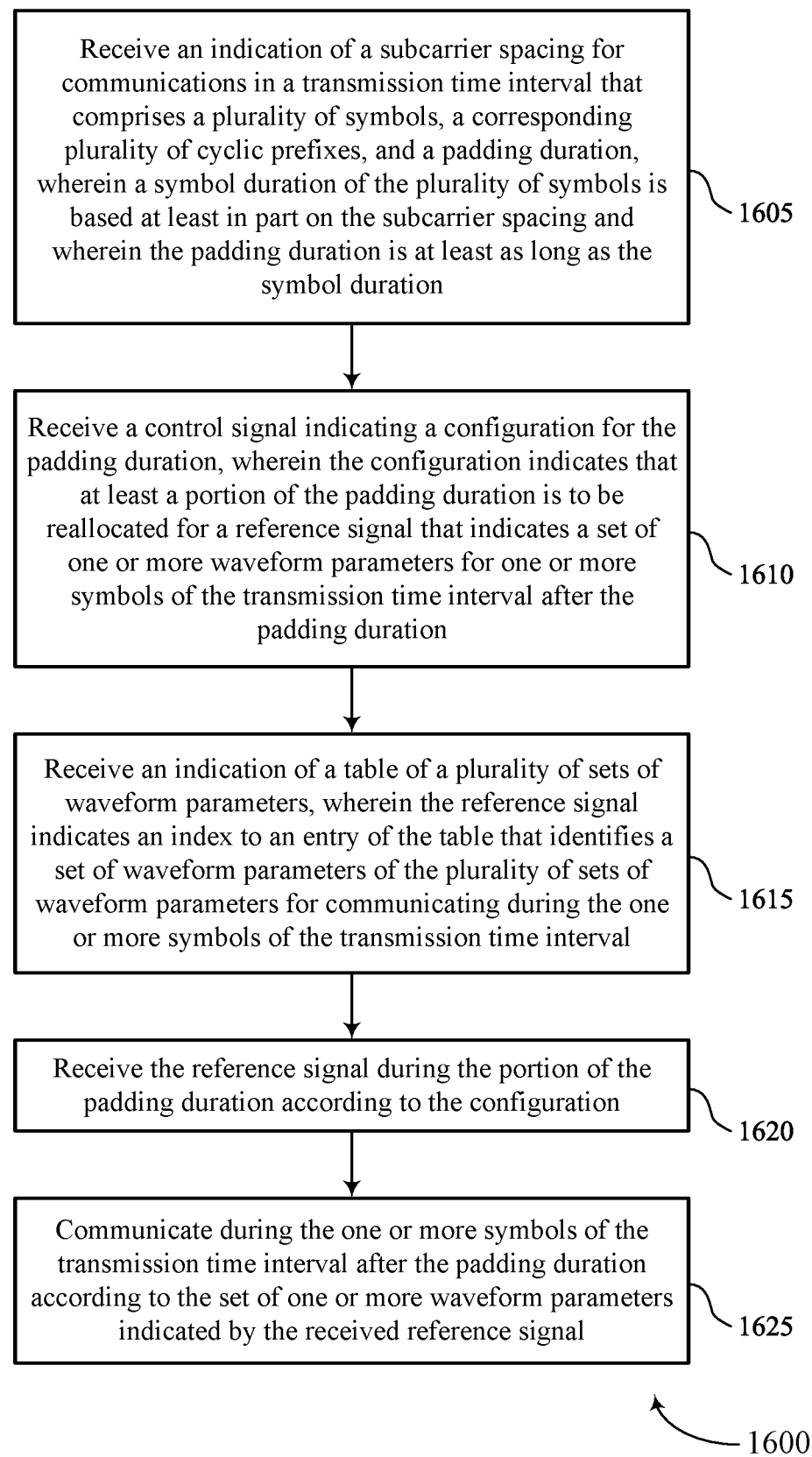

FIG. 16 shows a flowchart illustrating a method 1600 that supports sending reference signals during symbol padding in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The operations of 1605 may be performed in accordance with examples as disclosed herein. In some examples, aspects of the operations of 1605 may be performed by an SCS configuration component 925 as described with reference to FIG. 9.

At 1610, the method may include receiving a control signal indicating a configuration for the padding duration, where the configuration indicates that at least a portion of the padding duration is to be reallocated for a reference signal that indicates a set of one or more waveform parameters for one or more symbols of the TTI after the padding duration. The operations of 1610 may be performed in accordance with examples as disclosed herein. In some examples, aspects of the operations of 1610 may be performed by a padding duration configuration component 930 as described with reference to FIG. 9.

At 1615, the method may include receiving an indication of a table of a set of multiple sets of waveform parameters, where the reference signal indicates an index to an entry of the table that identifies a set of waveform parameters of the set of multiple sets of waveform parameters for communicating during the one or more symbols of the TTI. The operations of 1615 may be performed in accordance with examples as disclosed herein. In some examples, aspects of the operations of 1615 may be performed by a waveform parameter table component 945 as described with reference to FIG. 9.

At 1620, the method may include receiving the reference signal during the portion of the padding duration according to the configuration. The operations of 1620 may be performed in accordance with examples as disclosed herein. In some examples, aspects of the operations of 1620 may be performed by a reference signal reception component 935 as described with reference to FIG. 9.

At 1625, the method may include communicating during the one or more symbols of the TTI after the padding duration according to the set of one or more waveform parameters indicated by the received reference signal. The operations of 1625 may be performed in accordance with examples as disclosed herein. In some examples, aspects of the operations of 1625 may be performed by a signal communication component 940 as described with reference to FIG. 9.

Figure 17:
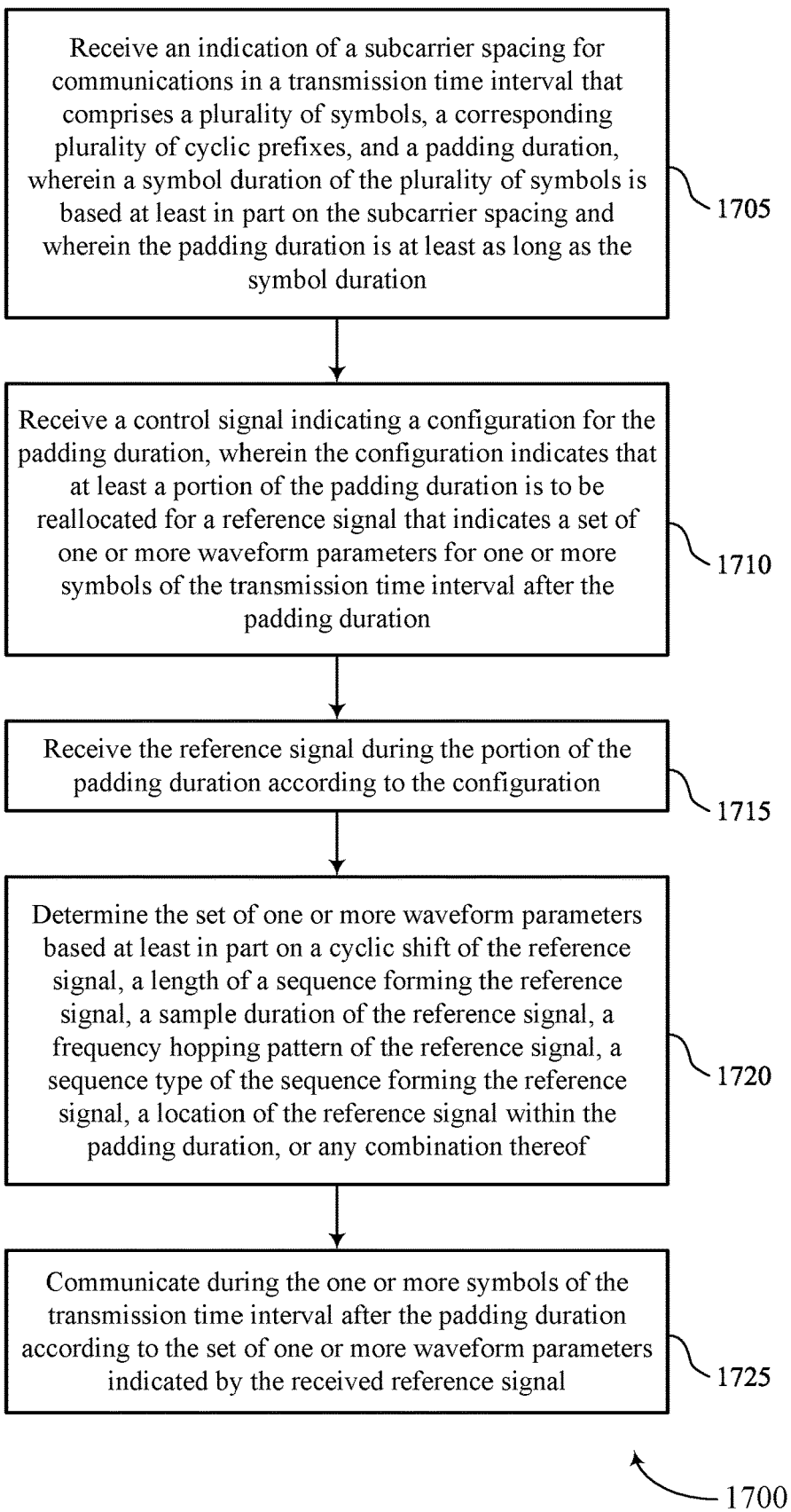

FIG. 17 shows a flowchart illustrating a method 1700 that supports sending reference signals during symbol padding in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The operations of 1705 may be performed in accordance with examples as disclosed herein. In some examples, aspects of the operations of 1705 may be performed by an SCS configuration component 925 as described with reference to FIG. 9.

At 1710, the method may include receiving a control signal indicating a configuration for the padding duration, where the configuration indicates that at least a portion of the padding duration is to be reallocated for a reference signal that indicates a set of one or more waveform parameters for one or more symbols of the TTI after the padding duration. The operations of 1710 may be performed in accordance with examples as disclosed herein. In some examples, aspects of the operations of 1710 may be performed by a padding duration configuration component 930 as described with reference to FIG. 9.

At 1715, the method may include receiving the reference signal during the portion of the padding duration according to the configuration. The operations of 1715 may be performed in accordance with examples as disclosed herein. In some examples, aspects of the operations of 1715 may be performed by a reference signal reception component 935 as described with reference to FIG. 9.

At 1720, the method may include determining the set of one or more waveform parameters based on a cyclic shift of the reference signal, a length of a sequence forming the reference signal, a sample duration of the reference signal, a frequency hopping pattern of the reference signal, a sequence type of the sequence forming the reference signal, a location of the reference signal within the padding duration, or any combination thereof. The operations of 1720 may be performed in accordance with examples as disclosed herein. In some examples, aspects of the operations of 1720 may be performed by a waveform parameter determining component 950 as described with reference to FIG. 9.

At 1725, the method may include communicating during the one or more symbols of the TTI after the padding duration according to the set of one or more waveform parameters indicated by the received reference signal. The operations of 1725 may be performed in accordance with examples as disclosed herein. In some examples, aspects of the operations of 1725 may be performed by a signal communication component 940 as described with reference to FIG. 9.

Figure 18:
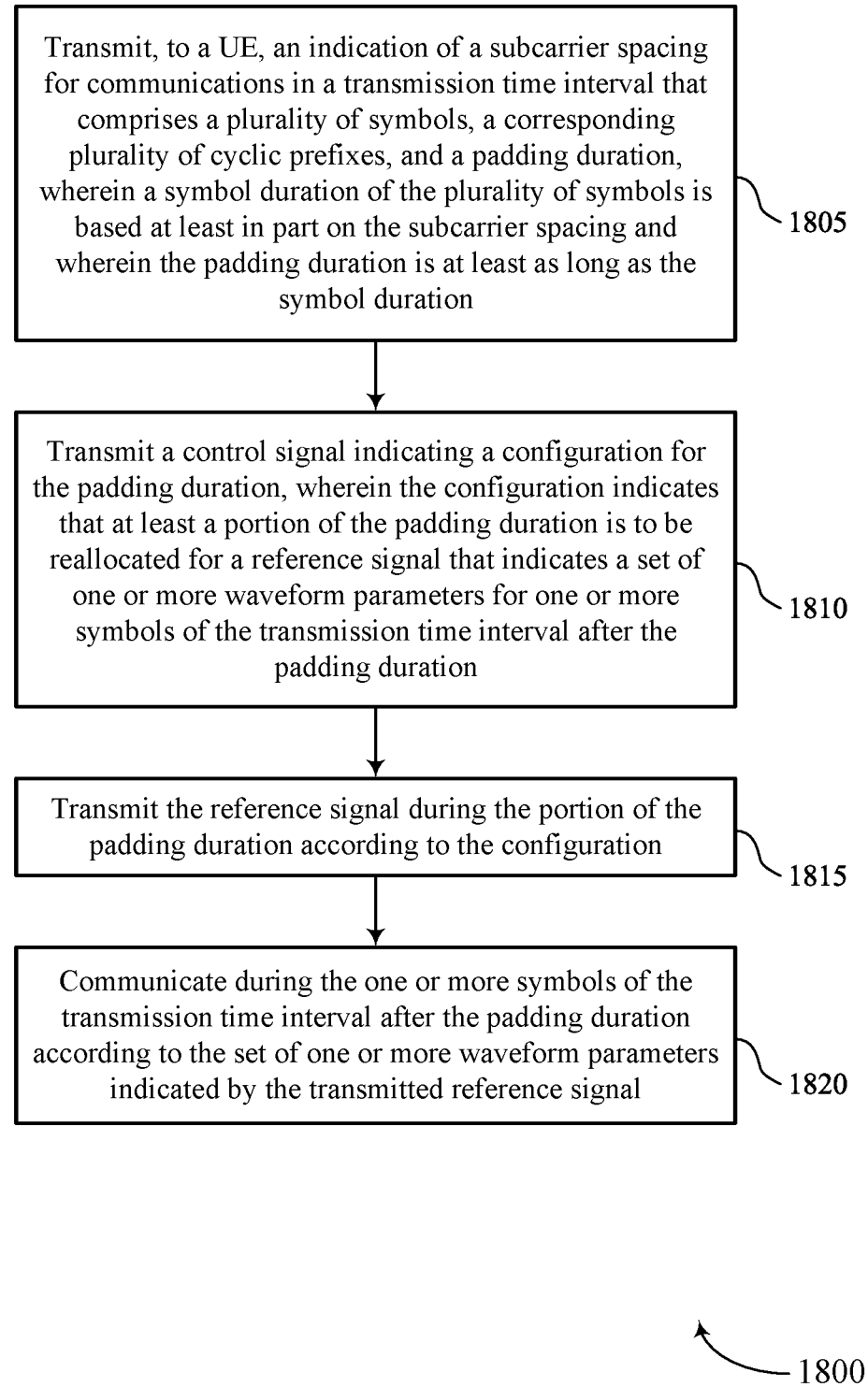

FIG. 18 shows a flowchart illustrating a method 1800 that supports sending reference signals during symbol padding in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The operations of 1805 may be performed in accordance with examples as disclosed herein. In some examples, aspects of the operations of 1805 may be performed by an SCS configuring component 1325 as described with reference to FIG. 13.

At 1810, the method may include transmitting a control signal indicating a configuration for the padding duration, where the configuration indicates that at least a portion of the padding duration is to be reallocated for a reference signal that indicates a set of one or more waveform parameters for one or more symbols of the TTI after the padding duration. The operations of 1810 may be performed in accordance with examples as disclosed herein. In some examples, aspects of the operations of 1810 may be performed by a padding duration configuring component 1330 as described with reference to FIG. 13.

At 1815, the method may include transmitting the reference signal during the portion of the padding duration according to the configuration. The operations of 1815 may be performed in accordance with examples as disclosed herein. In some examples, aspects of the operations of 1815 may be performed by a reference signal transmission component 1335 as described with reference to FIG. 13.

At 1820, the method may include communicating during the one or more symbols of the TTI after the padding duration according to the set of one or more waveform parameters indicated by the transmitted reference signal. The operations of 1820 may be performed in accordance with examples as disclosed herein. In some examples, aspects of the operations of 1820 may be performed by a signal communication component 1340 as described with reference to FIG. 13.

Figure 19:
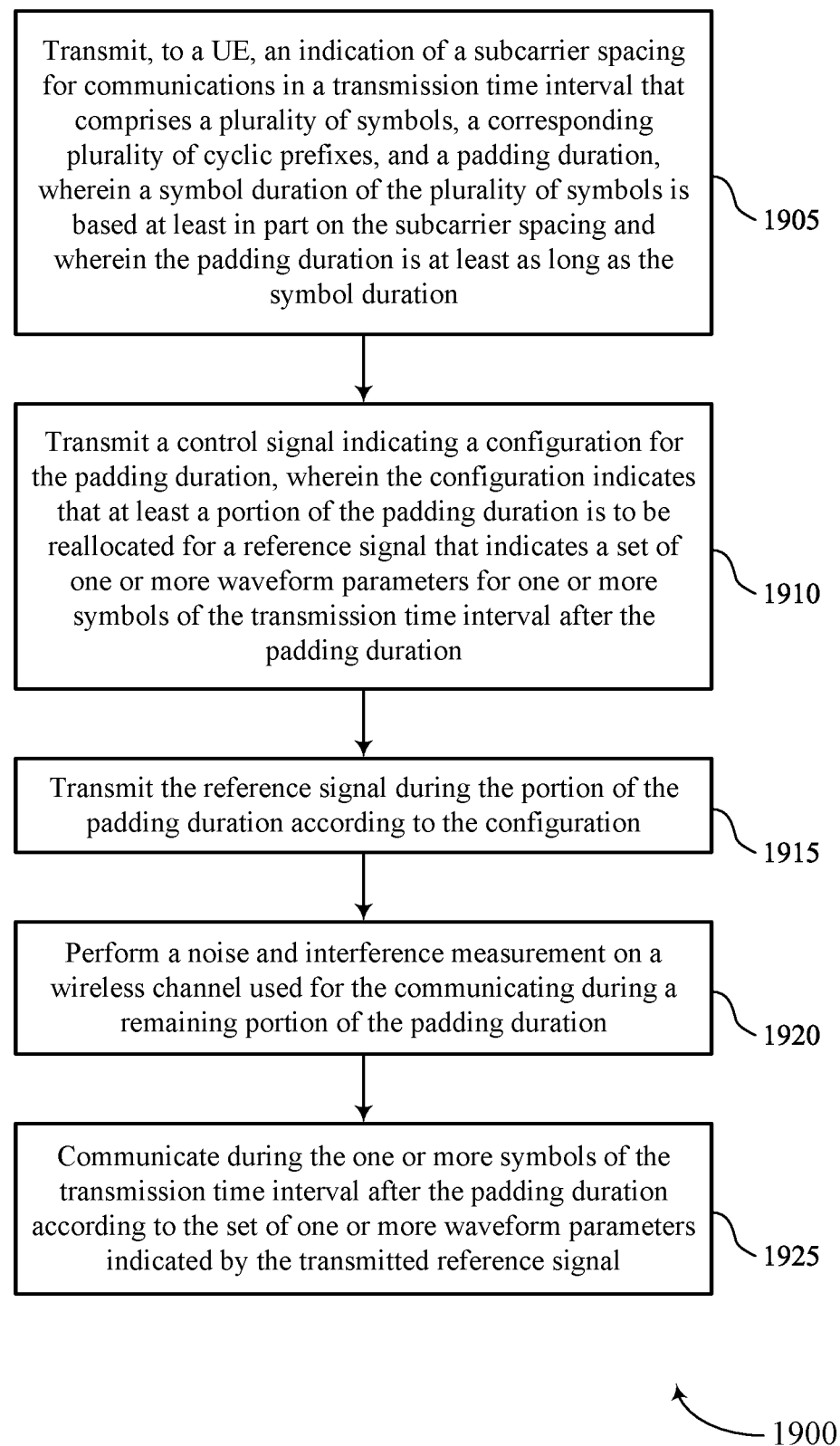

FIG. 19 shows a flowchart illustrating a method 1900 that supports sending reference signals during symbol padding in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, an indication of an SCS for communications in a TTI that includes a set of multiple symbols, a corresponding set of multiple cyclic prefixes, and a padding duration, where a symbol duration of the set of multiple symbols is based on the SCS and where the padding duration is at least as long as the symbol duration. The operations of 1905 may be performed in accordance with examples as disclosed herein. In some examples, aspects of the operations of 1905 may be performed by an SCS configuring component 1325 as described with reference to FIG. 13.

At 1910, the method may include transmitting a control signal indicating a configuration for the padding duration, where the configuration indicates that at least a portion of the padding duration is to be reallocated for a reference signal that indicates a set of one or more waveform parameters for one or more symbols of the TTI after the padding duration. The operations of 1910 may be performed in accordance with examples as disclosed herein. In some examples, aspects of the operations of 1910 may be performed by a padding duration configuring component 1330 as described with reference to FIG. 13.

At 1915, the method may include transmitting the reference signal during the portion of the padding duration according to the configuration. The operations of 1915 may be performed in accordance with examples as disclosed herein. In some examples, aspects of the operations of 1915 may be performed by a reference signal transmission component 1335 as described with reference to FIG. 13.

At 1920, the method may include performing a noise and interference measurement on a wireless channel used for the communicating during a remaining portion of the padding duration. The operations of 1920 may be performed in accordance with examples as disclosed herein. In some examples, aspects of the operations of 1920 may be performed by a measurement component 1365 as described with reference to FIG. 13.

At 1925, the method may include communicating during the one or more symbols of the TTI after the padding duration according to the set of one or more waveform parameters indicated by the transmitted reference signal. The operations of 1925 may be performed in accordance with examples as disclosed herein. In some examples, aspects of the operations of 1925 may be performed by a signal communication component 1340 as described with reference to FIG. 13.

The following provides an overview of aspects of the present disclosure:

Aspect 1: A method for wireless communication at a UE, comprising: receiving an indication of an SCS for communications in a TTI that comprises a plurality of symbols, a corresponding plurality of cyclic prefixes, and a padding duration, wherein a symbol duration of the plurality of symbols is based at least in part on the SCS and wherein the padding duration is at least as long as the symbol duration; receiving a control signal indicating a configuration for the padding duration, wherein the configuration indicates that at least a portion of the padding duration is to be reallocated for a reference signal that indicates a set of one or more waveform parameters for one or more symbols of the TTI after the padding duration; receiving the reference signal during the portion of the padding duration according to the configuration; and communicating during the one or more symbols of the TTI after the padding duration according to the set of one or more waveform parameters indicated by the received reference signal.

Aspect 2: The method of aspect 1, further comprising: receiving an indication of a table of a plurality of sets of waveform parameters, wherein the reference signal indicates an index to an entry of the table that identifies a set of waveform parameters of the plurality of sets of waveform parameters for communicating during the one or more symbols of the TTI.

Aspect 3: The method of any of aspects 1 through 2, further comprising: determining the set of one or more waveform parameters based at least in part on a cyclic shift of the reference signal, a length of a sequence forming the reference signal, a sample duration of the reference signal, a frequency hopping pattern of the reference signal, a sequence type of the sequence forming the reference signal, a location of the reference signal within the padding duration, or any combination thereof.

Aspect 4: The method of any of aspects 1 through 3, wherein communicating according to the set of one or more waveform parameters comprises: communicating according to a waveform type, a bandwidth part, a beam, a precoder, a symbol allocation, or any combination thereof, indicated by the set of one or more waveform parameters.

Aspect 5: The method of any of aspects 1 through 4, wherein receiving the control signal indicating the configuration for the padding duration comprises: receiving an indication of an offset of zero or more from the reference signal to a first symbol of the one or more symbols of the TTI in which the set of one or more waveform parameters are applied.

Aspect 6: The method of aspect 5, further comprising: determining the offset based at least in part on a waveform switching capability of the UE, wherein the offset includes one or more samples or one or more symbol periods.

Aspect 7: The method of any of aspects 1 through 6, wherein receiving the reference signal comprises: receiving the reference signal as a multi-carrier waveform or a single carrier waveform.

Aspect 8: The method of any of aspects 1 through 7, further comprising: transmitting, to a base station, an indication of a UE capability to receive reference signals during padding durations, wherein the control signal indicating the configuration for the padding duration is received based at least in part on transmitting the UE capability.

Aspect 9: The method of any of aspects 1 through 8, wherein receiving the reference signal comprises: receiving a phase tracking reference signal, a demodulation reference signal, a channel state information reference signal, or any combination thereof.

Aspect 10: The method of any of aspects 1 through 9, wherein receiving the reference signal comprises: receiving the reference signal and a cyclic prefix for the reference signal during the portion of the padding duration, wherein the reference signal spans a shorter time duration than a symbol period based at least in part on the SCS.

Aspect 11: The method of any of aspects 1 through 10, wherein receiving the reference signal comprises: receiving a plurality of reference signals during the portion of the padding duration based at least in part on the SCS of the TTI.

Aspect 12: The method of any of aspects 1 through 11, further comprising: receiving, during a remaining portion of the padding duration, a cyclic prefix associated with one or more of the reference signals, the plurality of symbols, or the plurality of cyclic prefixes.

Aspect 13: The method of any of aspects 1 through 12, further comprising: performing a noise and interference measurement on a wireless channel used for the communicating during a remaining portion of the padding duration.

Aspect 14: The method of any of aspects 1 through 13, wherein receiving the reference signal comprises: receiving an indication of a retransmission request from a base station based at least in part on a configuration of the received reference signal.

Aspect 15: The method of any of aspects 1 through 14, further comprising: transmitting, during the portion of the padding duration, an indication of acknowledgement feedback in response to a received downlink message.

Aspect 16: The method of any of aspects 1 through 15, further comprising: identifying a first set of waveform parameters applicable to the communicating during the one or more symbols; determining a waveform parameter value for one or more waveform parameters of the first set of waveform parameters based at least in part on the reference signal; and communicating during the one or more symbols according to the first set of waveform parameters and the waveform parameter value determined based at least in part on the reference signal.

Aspect 17: A method for wireless communication at a base station, comprising: transmitting, to a UE, an indication of an SCS for communications in a TTI that comprises a plurality of symbols, a corresponding plurality of cyclic prefixes, and a padding duration, wherein a symbol duration of the plurality of symbols is based at least in part on the SCS and wherein the padding duration is at least as long as the symbol duration; transmitting a control signal indicating a configuration for the padding duration, wherein the configuration indicates that at least a portion of the padding duration is to be reallocated for a reference signal that indicates a set of one or more waveform parameters for one or more symbols of the TTI after the padding duration; transmitting the reference signal during the portion of the padding duration according to the configuration; and communicating during the one or more symbols of the TTI after the padding duration according to the set of one or more waveform parameters indicated by the transmitted reference signal.

Aspect 18: The method of aspect 17, further comprising: transmitting an indication of a table of a plurality of sets of waveform parameters, wherein the reference signal indicates an index to an entry of the table that identifies a set of waveform parameters of the plurality of sets of waveform parameters for communicating during the one or more symbols of the TTI.

Aspect 19: The method of any of aspects 17 through 18, further comprising: indicating the set of one or more waveform parameters based at least in part on a cyclic shift of the reference signal, a length of a sequence forming the reference signal, a sample duration of the reference signal, a frequency hopping pattern of the reference signal, a sequence type of the sequence forming the reference signal, a location of the reference signal within the padding duration, or any combination thereof.

Aspect 20: The method of any of aspects 17 through 19, wherein communicating according to the set of one or more waveform parameters comprises: communicating according to a waveform type, a bandwidth part, a beam, a precoder, a symbol allocation, or any combination thereof, indicated by the set of one or more waveform parameters.

Aspect 21: The method of any of aspects 17 through 20, wherein transmitting the control signal indicating the configuration for the padding duration comprises: transmitting an indication of an offset from the reference signal to a first symbol of the one or more symbols of the TTI for communicating according to the set of one or more waveform parameters.

Aspect 22: The method of any of aspects 17 through 21, further comprising: receiving, from the UE, an indication of a UE capability to receive reference signals during padding durations, wherein the control signal indicating the configuration for the padding duration is transmitted based at least in part on receiving the indication of the UE capability.

Aspect 23: The method of any of aspects 17 through 22, wherein transmitting the reference signal comprises: transmitting the reference signal and a cyclic prefix for the reference signal during the portion of the padding duration, wherein the reference signal spans a shorter time duration than a symbol period based at least in part on the SCS.

Aspect 24: The method of any of aspects 17 through 23, wherein transmitting the reference signal comprises: transmitting a plurality of reference signals during the portion of the padding duration based at least in part on the SCS of the TTI.

Aspect 25: The method of any of aspects 17 through 24, further comprising: transmitting, during a remaining portion of the padding duration, a cyclic prefix associated with one or more of the reference signal, the plurality of symbols, or the plurality of cyclic prefixes.

Aspect 26: The method of any of aspects 17 through 25, further comprising: performing a noise and interference measurement on a wireless channel used for the communicating during a remaining portion of the padding duration.

Aspect 27: The method of any of aspects 17 through 26, wherein transmitting the reference signal comprises: transmitting an indication of a retransmission request to the UE based at least in part on a configuration of the received reference signal.

Aspect 28: The method of any of aspects 17 through 27, further comprising: receiving, during the portion of the padding duration, an indication of acknowledgment feedback in response to a transmitted downlink message.

Aspect 29: An apparatus for wireless communication at a UE, comprising a processor; memory coupled with the processor; and instructions stored in the memory and executable by the processor to cause the apparatus to perform a method of any of aspects 1 through 16.

Aspect 30: An apparatus for wireless communication at a UE, comprising at least one means for performing a method of any of aspects 1 through 16.

Aspect 31: A non-transitory computer-readable medium storing code for wireless communication at a UE, the code comprising instructions executable by a processor to perform a method of any of aspects 1 through 16.

Aspect 32: An apparatus for wireless communication at a base station, comprising a processor; memory coupled with the processor; and instructions stored in the memory and executable by the processor to cause the apparatus to perform a method of any of aspects 17 through 28.

Aspect 33: An apparatus for wireless communication at a base station, comprising at least one means for performing a method of any of aspects 17 through 28.

Aspect 34: A non-transitory computer-readable medium storing code for wireless communication at a base station, the code comprising instructions executable by a processor to perform a method of any of aspects 17 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
 a memory; and
 one or more processors coupled to the memory, the one or more processors configured to:
  receive an indication of a subcarrier spacing for communications in a transmission time interval that comprises a plurality of symbols, a corresponding plurality of cyclic prefixes, and a padding duration, wherein a symbol duration of the plurality of symbols is based at least in part on the subcarrier spacing and wherein the padding duration is at least as long as the symbol duration;
  receive a control signal indicating a configuration for the padding duration, wherein the configuration indicates that at least a portion of the padding duration is to be reallocated for a reference signal that indicates a set of one or more waveform parameters for one or more symbols of the transmission time interval after the padding duration;

receive the reference signal during the portion of the padding duration according to the configuration; and communicate during the one or more symbols of the transmission time interval after the padding duration according to the set of one or more waveform parameters indicated by the received reference signal.

2. The apparatus of claim 1, the one or more processors further configured to:

receive an indication of a table of a plurality of sets of waveform parameters, wherein the reference signal indicates an index to an entry of the table that identifies a set of waveform parameters of the plurality of sets of waveform parameters for communicating during the one or more symbols of the transmission time interval.

3. The apparatus of claim 1, the one or more processors further configured to:

determine the set of one or more waveform parameters based at least in part on a cyclic shift of the reference signal, a length of a sequence forming the reference signal, a sample duration of the reference signal, a frequency hopping pattern of the reference signal, a sequence type of the sequence forming the reference signal, a location of the reference signal within the padding duration, or any combination thereof.

4. The apparatus of claim 1, wherein to communicate according to the set of one or more waveform parameters, the one or more processors are further configured to:

communicate according to a waveform type, a bandwidth part, a beam, a precoder, a symbol allocation, or any combination thereof, indicated by the set of one or more waveform parameters.

5. The apparatus of claim 1, wherein to receive the control signal indicating the configuration for the padding duration, the one or more processors are further configured to:

receive an indication of an offset of zero or more from the reference signal to a first symbol of the one or more symbols of the transmission time interval in which the set of one or more waveform parameters are applied.

6. The apparatus of claim 5, the one or more processors further configured to:

determine the offset based at least in part on a waveform switching capability of the UE, wherein the offset includes one or more samples or one or more symbol periods.

7. The apparatus of claim 1, wherein to receive the reference signal, the one or more processors are further configured to:

receive the reference signal as a multi-carrier waveform or a single carrier waveform.

8. The apparatus of claim 1, the one or more processors further configured to:

transmit, to a base station, an indication of a UE capability to receive reference signals during padding durations, wherein the control signal indicating the configuration for the padding duration is received based at least in part on transmitting the UE capability.

9. The apparatus of claim 1, wherein to receive the reference signal, the one or more processors are further configured to:

receive a phase tracking reference signal, a demodulation reference signal, a channel state information reference signal, or any combination thereof.

10. The apparatus of claim 1, wherein to receive the reference signal, the one or more processors are further configured to:

receive the reference signal and a cyclic prefix for the reference signal during the portion of the padding duration, wherein the reference signal spans a shorter time duration than a symbol period based at least in part on the subcarrier spacing.

11. The apparatus of claim 1, wherein to receive the reference signal, the one or more processors are further configured to:

receive a plurality of reference signals during the portion of the padding duration based at least in part on the subcarrier spacing of the transmission time interval.

12. The apparatus of claim 1, the one or more processors further configured to:

receive, during a remaining portion of the padding duration, a cyclic prefix associated with one or more reference signals, the plurality of symbols, or the plurality of cyclic prefixes.

13. The apparatus of claim 1, the one or more processors further configured to:

perform a noise and interference measurement on a wireless channel used for the communicating during a remaining portion of the padding duration.

14. The apparatus of claim 1, wherein to receive the reference signal, the one or more processors are further configured to:

receive an indication of a retransmission request from a base station based at least in part on a configuration of the received reference signal.

15. The apparatus of claim 1, the one or more processors further configured to:

transmit, during the portion of the padding duration, an indication of acknowledgement feedback in response to a received downlink message.

16. The apparatus of claim 1, the one or more processors further configured to:

identify a first set of waveform parameters applicable to the communicating during the one or more symbols;

determine a waveform parameter value for one or more waveform parameters of the first set of waveform parameters based at least in part on the reference signal; and communicate during the one or more symbols according to the first set of waveform parameters and the waveform parameter value determined based at least in part on the reference signal.

17. An apparatus for wireless communication at a base station, comprising:

a memory; and one or more processors coupled to the memory, the one or more processors configured to:

transmit, to a user equipment (UE), an indication of a subcarrier spacing for communications in a transmission time interval that comprises a plurality of symbols, a corresponding plurality of cyclic prefixes, and a padding duration, wherein a symbol duration of the plurality of symbols is based at least in part on the subcarrier spacing and wherein the padding duration is at least as long as the symbol duration;

transmit a control signal indicating a configuration for the padding duration, wherein the configuration indicates that at least a portion of the padding duration is to be reallocated for a reference signal that indicates a set of one or more waveform parameters for one or more symbols of the transmission time interval after the padding duration;
transmit the reference signal during the portion of the padding duration according to the configuration; and
communicate during the one or more symbols of the transmission time interval after the padding duration according to the set of one or more waveform parameters indicated by the transmitted reference signal.

18. The apparatus of claim 17, the one or more processors further configured to:
transmit an indication of a table of a plurality of sets of waveform parameters, wherein the reference signal indicates an index to an entry of the table that identifies a set of waveform parameters of the plurality of sets of waveform parameters for communicating during the one or more symbols of the transmission time interval.

19. The apparatus of claim 17, the one or more processors further configured to:
indicate the set of one or more waveform parameters based at least in part on a cyclic shift of the reference signal, a length of a sequence forming the reference signal, a sample duration of the reference signal, a frequency hopping pattern of the reference signal, a sequence type of the sequence forming the reference signal, a location of the reference signal within the padding duration, or any combination thereof.

20. The apparatus of claim 17, wherein to communicate according to the set of one or more waveform parameters, the one or more processors are further configured to:
communicate according to a waveform type, a bandwidth part, a beam, a precoder, a symbol allocation, or any combination thereof, indicated by the set of one or more waveform parameters.

21. A method for wireless communication at a user equipment (UE), comprising:
receiving an indication of a subcarrier spacing for communications in a transmission time interval that comprises a plurality of symbols, a corresponding plurality of cyclic prefixes, and a padding duration, wherein a symbol duration of the plurality of symbols is based at least in part on the subcarrier spacing and wherein the padding duration is at least as long as the symbol duration;
receiving a control signal indicating a configuration for the padding duration, wherein the configuration indicates that at least a portion of the padding duration is to be reallocated for a reference signal that indicates a set of one or more waveform parameters for one or more symbols of the transmission time interval after the padding duration;
receiving the reference signal during the portion of the padding duration according to the configuration; and
communicating during the one or more symbols of the transmission time interval after the padding duration according to the set of one or more waveform parameters indicated by the received reference signal.

22. The method of claim 21, further comprising:
receiving an indication of a table of a plurality of sets of waveform parameters, wherein the reference signal indicates an index to an entry of the table that identifies a set of waveform parameters of the plurality of sets of waveform parameters for communicating during the one or more symbols of the transmission time interval.

23. The method of claim 21, further comprising:
determining the set of one or more waveform parameters based at least in part on a cyclic shift of the reference signal, a length of a sequence forming the reference signal, a sample duration of the reference signal, a frequency hopping pattern of the reference signal, a sequence type of the sequence forming the reference signal, a location of the reference signal within the padding duration, or any combination thereof.

24. The method of claim 21, wherein communicating according to the set of one or more waveform parameters comprises:
communicating according to a waveform type, a bandwidth part, a beam, a precoder, a symbol allocation, or any combination thereof, indicated by the set of one or more waveform parameters.

25. The method of claim 21, wherein receiving the control signal indicating the configuration for the padding duration comprises:
receiving an indication of an offset of zero or more from the reference signal to a first symbol of the one or more symbols of the transmission time interval in which the set of one or more waveform parameters are applied.

26. The method of claim 25, further comprising:
determining the offset based at least in part on a waveform switching capability of the UE, wherein the offset includes one or more samples or one or more symbol periods.

27. The method of claim 21, wherein receiving the reference signal comprises:
receiving the reference signal as a multi-carrier waveform or a single carrier waveform.

28. The method of claim 21, further comprising:
transmitting, to a base station, an indication of a UE capability to receive reference signals during padding durations, wherein the control signal indicating the configuration for the padding duration is received based at least in part on transmitting the UE capability.

29. The method of claim 21, wherein receiving the reference signal comprises:
receiving a phase tracking reference signal, a demodulation reference signal, a channel state information reference signal, or any combination thereof.

30. A method for wireless communication at a base station, comprising:
transmitting, to a user equipment (UE), an indication of a subcarrier spacing for communications in a transmission time interval that comprises a plurality of symbols, a corresponding plurality of cyclic prefixes, and a padding duration, wherein a symbol duration of the plurality of symbols is based at least in part on the subcarrier spacing and wherein the padding duration is at least as long as the symbol duration;
transmitting a control signal indicating a configuration for the padding duration, wherein the configuration indicates that at least a portion of the padding duration is to be reallocated for a reference signal that indicates a set of one or more waveform parameters for one or more symbols of the transmission time interval after the padding duration;
transmitting the reference signal during the portion of the padding duration according to the configuration; and
communicating during the one or more symbols of the transmission time interval after the padding duration according to the set of one or more waveform parameters indicated by the transmitted reference signal.

* * * * *